United States Patent
Osadchyy et al.

(10) Patent No.: US 9,858,021 B2
(45) Date of Patent: Jan. 2, 2018

(54) CLOUD DEVICE ACCOUNTING IN A DECENTRALIZED ENVIRONMENT

(71) Applicant: KYOCERA Document Solutions Inc., Osaka (JP)

(72) Inventors: Oleksandr Osadchyy, Concord, CA (US); Tai Yu Chen, Dublin, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/164,795

(22) Filed: May 25, 2016

(65) Prior Publication Data

US 2017/0344325 A1    Nov. 30, 2017

(51) Int. Cl.
*G06F 3/12*    (2006.01)

(52) U.S. Cl.
CPC .......... *G06F 3/1288* (2013.01); *G06F 3/1211* (2013.01); *G06F 3/1222* (2013.01); *G06F 3/1236* (2013.01); *G06F 3/1268* (2013.01); *G06F 3/1273* (2013.01); *H04N 2201/0094* (2013.01)

(58) Field of Classification Search
CPC .................................................... G06F 3/1288
USPC ........................................................ 358/1.15
See application file for complete search history.

(56) References Cited

U.S. PATENT DOCUMENTS

| | | | |
|---|---|---|---|
| 8,593,677 B2 | 11/2013 | Nishimi et al. | |
| 2009/0244596 A1* | 10/2009 | Katano | G06F 21/608 358/1.15 |
| 2012/0147420 A1* | 6/2012 | Nishimi | G06F 3/1204 358/1.15 |
| 2014/0368865 A1* | 12/2014 | Gutnik | G06F 3/1222 358/1.15 |

* cited by examiner

*Primary Examiner* — Jacky X Zheng
(74) *Attorney, Agent, or Firm* — McDonnell Boehnen Hulbert & Berghoff LLP

(57) ABSTRACT

Example apparatus and methods are disclosed for monitoring and controlling networked printing devices. A computing device can capture a printing device identifier of a printing device, where the printing device can be communicatively coupled to at least the computing device via a local network. The computing device can send a request to unlock the printing device. The computing device can receive an indication that the printing device is unlocked. After receiving the indication that the printing device is unlocked, the computing device can send a job request requesting execution of a job on the printing device, where the job request can include identification information associated with the computing device and the printing device identifier. The computing device can send job accounting information related to usage of the printing device related at least to the executed job request.

20 Claims, 12 Drawing Sheets

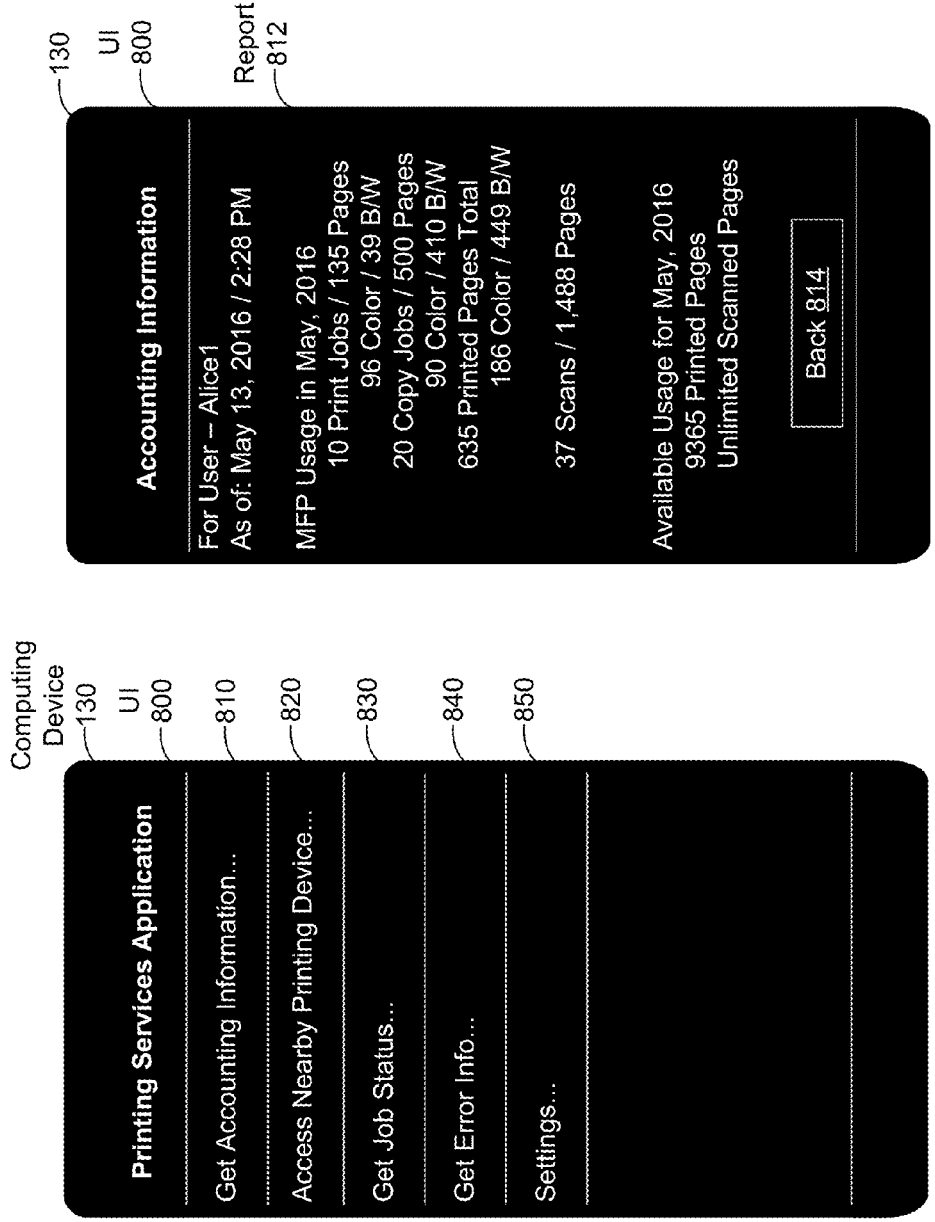

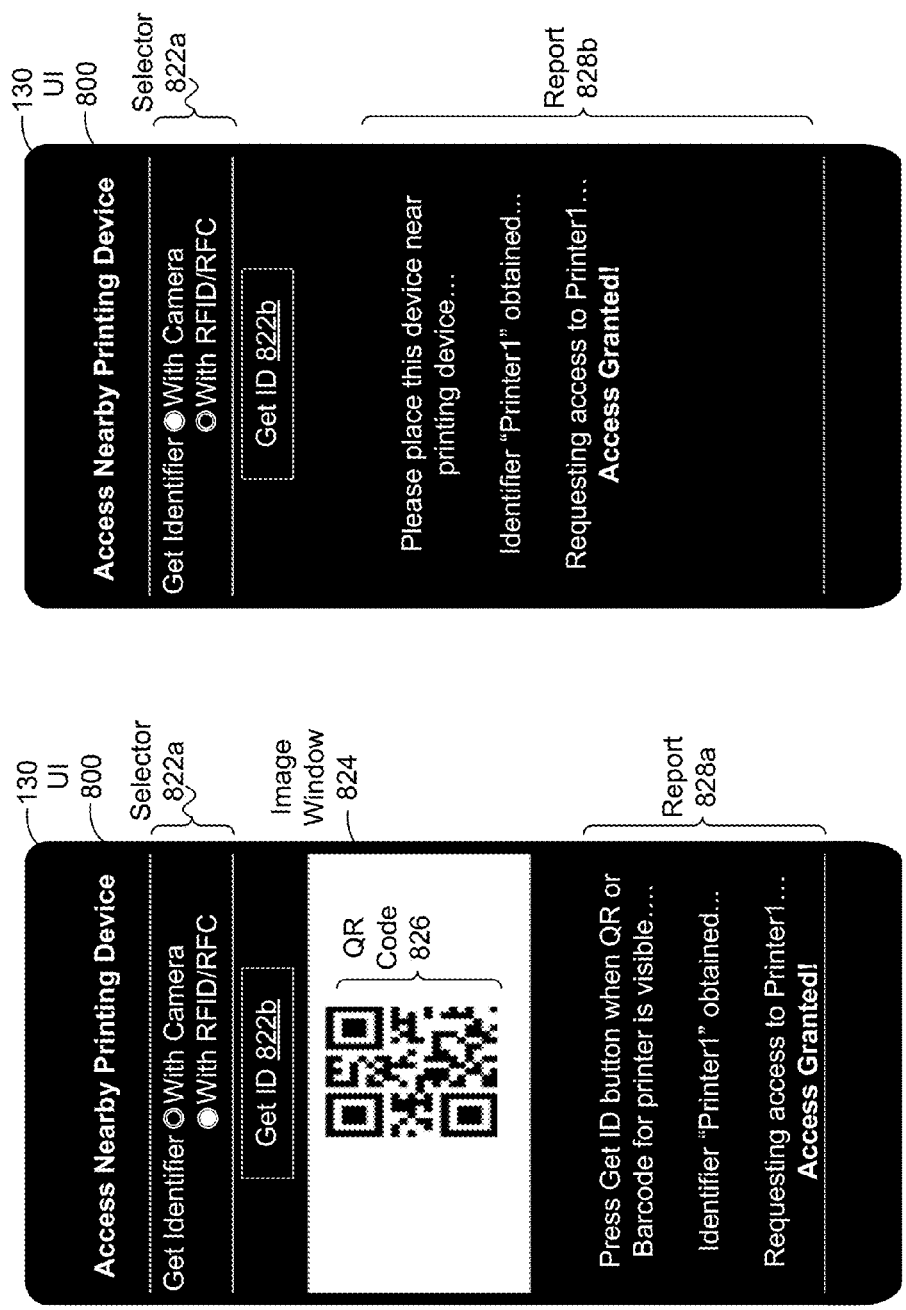

CLOUD DEVICE ACCOUNTING IN A DECENTRALIZED ENVIRONMENT

BACKGROUND

Printing devices have increased in number and geographic footprint throughout the world and have become increasingly connected to networks. These networks can include a print server. Typically, when one or more documents and/or other print data are scheduled to be printed, the print data is either directly sent to one printing device, or sent to a print server. As computing devices, including mobile computing devices, have become more prevalent, complex, and interconnected, one printing device is often supporting increasingly larger numbers of computing devices. Further, some owners of printing and computing devices prefer using their own computing devices and local network(s) for printing purposes without utilizing additional and/or remote computing devices.

SUMMARY

In a first aspect, a method is provided. A computing device captures a printing device identifier of a printing device. The computing device sends a request to unlock the printing device. The computing device receives an indication that the printing device is unlocked. After receiving the indication that the printing device is unlocked, the computing device sends a job request. The job request includes identification information associated with the computing device and the printing device identifier. The job request requests execution of a job on the printing device, where the printing device is communicatively coupled to at least the computing device via a local network. The computing device sends job accounting information related to usage of the printing device related at least to the executed job request.

In a second aspect, a system is provided. The system includes a printing device, a local network, and a computing device communicatively at least to the printing device via the local network. The computing device includes one or more processors; and a memory storing instructions that, when executed by the one or more processors, causes the computing device to perform functions. The functions include: capturing a printing device identifier of the printing device; sending a request to unlock the printing device; receiving an indication that the printing device is unlocked; after receiving the indication that the printing device is unlocked, sending a job request, where the job request includes identification information associated with the computing device and the printing device identifier, and where the job request requests execution of a job on the printing device; and sending job accounting information related to usage of the printing device related at least to the executed job request.

In a third aspect, a non-transitory computer readable medium stores instructions that, when executed by one or more processors of a computing device, cause the computing device to perform functions. The functions include: capturing a printing device identifier of a printing device; sending a request to unlock the printing device; receiving an indication that the printing device is unlocked; after receiving the indication that the printing device is unlocked, sending a job request, where the job request includes identification information associated with the computing device and the printing device identifier, and where the job request requests execution of a job on the printing device; and sending job accounting information related to usage of the printing device related at least to the executed job request.

These, as well as other aspects, alternatives, and advantages, will become apparent to those of ordinary skill in the art by reading the following detailed description, with reference where appropriate to the accompanying drawings.

BRIEF DESCRIPTION OF THE DRAWINGS

FIGS. 8A-8E illustrate an example user interface for a printing services application, according to an example embodiment.

DETAILED DESCRIPTION

Figure 1:
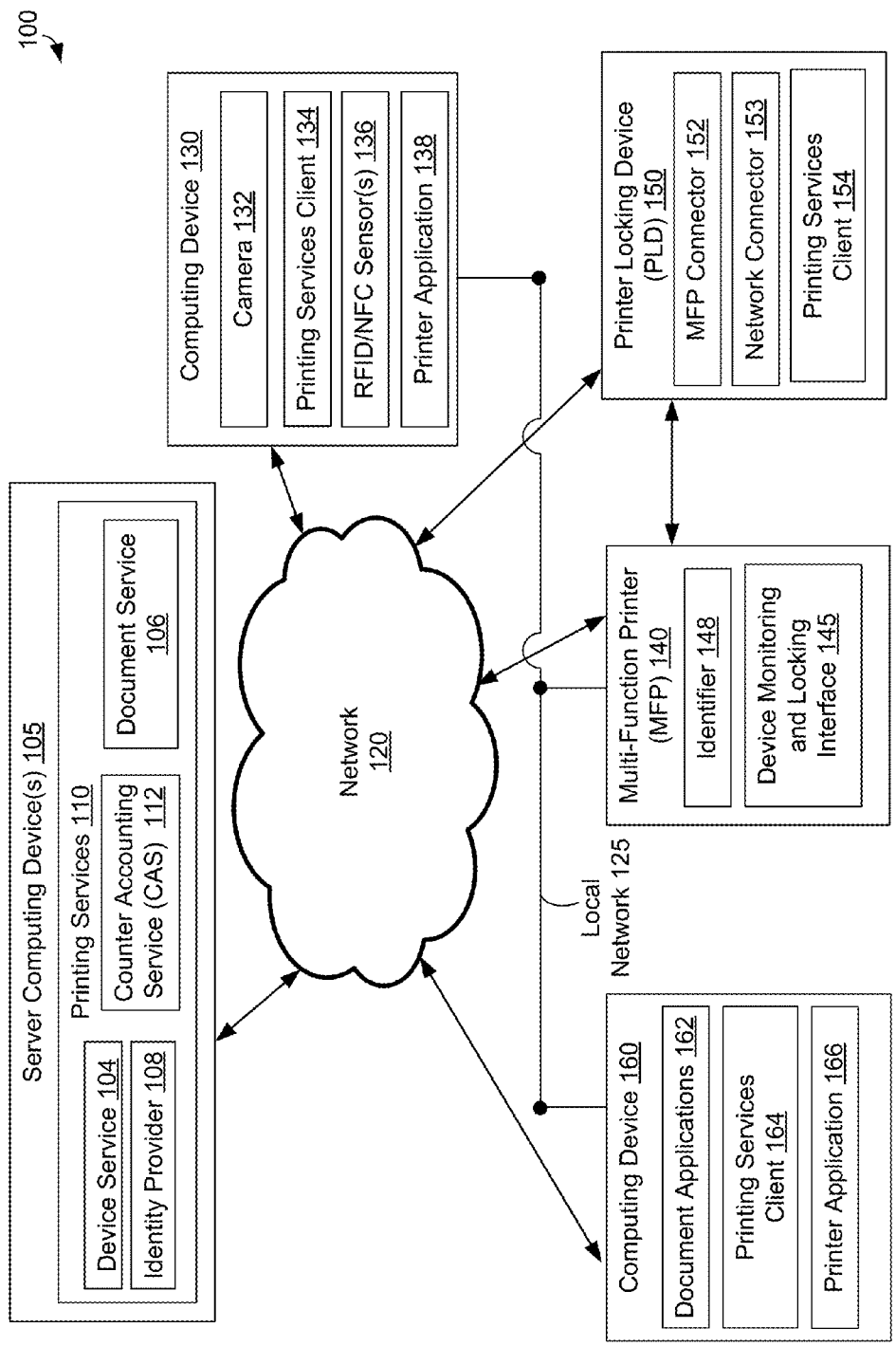
FIG. 1 illustrates an example printing network, according to an example embodiment.

Improving and/or simplifying management, access, and control of printing devices can enhance customer satisfaction and generate positive business results. Thus, improving and/or simplifying management, access, and control of printing devices by allowing customers to use their own existing computing devices without little or no reliance on outside computing devices may increase customer satisfaction.

The accessibility of managed printing devices can influence how effectively a user can execute jobs on managed printing devices. Enabling mobile computing devices to access managed printing devices via a network (such as the Internet) enables increased convenience and printer-related functionality to users of the mobile computing devices.

A server can provide the software services that enable (mobile) computing devices to execute print jobs on one or more printing devices managed by the server. The server can maintain security for the managed printing device(s). In particular, access can be restricted to the managed printing device(s) to ensure that only authorized users execute jobs on the printing devices. The server can monitor and track executed jobs on the managed printing device(s) to provide job accounting; that is, recording that a particular user (or other entity) requested a particular print job. The server can also provide an easy-to-use system that utilizes little or no additional hardware. In some cases, printing jobs should remain in a local network as much as possible, even if some printing aspects, such as document access and/or job accounting, are controlled by the server. That is, in these cases, printing jobs originated by a computing device connected to a local network should be provided to a printing device also connected to the local network.

In some embodiments, the server can authorize a computing device to use a managed printing device based on identification information received from the computing device. The server can determine a requested managed printing device based on a job request received from the computing device. The job request can be for a print job, a scan job, a copy job, a fax job, or some other function performed by the requested managed printing device. The server can determine the requested managed printing device based on a printing device identifier associated with the requested managed printing device. In some embodiments, a camera or other sensing device can be used, perhaps with related software, to obtain the printing device identifier (e.g., an identifier encoded and/or embedded in a quick response (QR) code, a barcode, near field communication (NFC) identification, Radio Frequency Identification (RFID), etc.).

The server can determine that the computing device is authorized to access the identified printing device to execute the job. The server can send a message to a printer locking device coupled to the printing device to enable the printing device to execute the job. The server can send a request to a computing device for job accounting information for the job completed by the printing device. The computing device can be communicatively coupled to the printing device via a local network. After receiving the job accounting information for the job from the computing device, the server can update the job accounting information for the computing device to include the job accounting information for the completed job.

The system and method for maintaining, accessing, and controlling managed printing devices to execute jobs using servers can provide several benefits. First, the user can rely on existing computing devices (e.g., a smart phone, a mobile phone, a personal digital assistant (PDA), a tablet, a laptop, a desktop, a smart watch, a wearable computing device, and/or another computing device) to execute jobs on the printing devices. Additionally, the user can only need a printer locking device as additional hardware to install to implement the system. Further, the user can execute jobs on the managed printing devices by installing a software application on the computing device. The software application can communicate with server software applications to execute jobs on the managed printing devices.

Example Printing Device Network

FIG. 1 is a diagram illustrating printing network 100, according to an example embodiment. Printing network 100 includes server computing device(s) 105, network 120, local network 125, computing devices 130, 160, multi-function printer (MFP) 140, and printer locking device 150. In other examples, more, fewer, and/or different devices can be in printing network 100.

Server computing device(s) 105 includes one or more computing devices configured to carry out one or more tasks to manage, control, and/or maintain printing devices. For example, server computing device(s) 105 can provide one or more printing services 110 to manage, enable access including job processing, control, and/or maintain printing devices that can be accessible via the public network 120. As such, server computing device(s) 105 and printing services 110 can enable a computing device, such as computing device 130, computing device 160, and/or other computing device(s) to process jobs, control, and/or maintain printing devices, such as multi-function printer 140. Also, server computing device(s) 105 and printing services 110 can send requests to computing devices, such as computing devices 130, 160, to determine accounting information for a particular job, user, and/or computing device. In other embodiments, server computing device(s) 105 and/or printing services 110 can execute more, fewer, and/or different tasks than those described herein.

Printing services 110 include device service 104, document service 106, identity provider 108, and counter accounting service 112. Device service 104 can provide communication and resource allocation features related to maintenance, control, and/or management of printing devices, and provide these features to devices in printing network 100. Document service 106 can provide storage, retrieval, editing, and removal features to devices in printing network 100—these features can be related to one or more files, such as one or more files containing one or more documents, images, audio files, video files, and/or other types of information.

Identity provider 108 can provide authentication services to devices in printing network 100; e.g., services for whether a specified user and/or a specified computing device is authorized to utilize a requested printing device to execute a job. Counter accounting service 112 can provide accounting services to devices in printing network 100, including but not limited to, job accounting services, device accounting services, and user accounting service to determine usage, billing, maintenance, and/or other information for managing the printing devices. In particular, counter accounting service 112 can monitor and track the jobs being executed on managed printing devices, as well as the users and computing devices requesting the jobs to be executed. Also, counter accounting service 112 can provide usage reports and/or job accounting information in response to a request for such reports and/or information. More, fewer, and/or different printing services 110 are possible as well.

Networks 120 and 125 can enable communications between one or more computing devices. For example, network 120 can be or include a public network, such as the Internet, enabling communications between server computing device(s) 105, computing devices 130, 160, multi-function printer 140, and printer locking device 150. In some embodiments, server computing device(s) 105 can communicate with more, fewer, and/or different computing devices than those displayed in FIG. 1. Local network 125 can enable communications between devices within a limited area, such as an office building. As shown in FIG. 1, local network 125 interconnects computing devices 130, 160, multi-function printer 140, and printer locking device 150. In the example shown in FIG. 1, local network 125 is not directly connected to network 120, while in other examples, local network can be connected to and/or be part of network 120.

FIG. 1 shows that computing device 130 includes camera 132, printing services client 134, RFID/NFC sensor(s) 136, and printer application 138, and that computing device 160 includes document applications 162, printing services client 164, and printer application 166.

A computing device, such as computing device 130 or 160, can communicate with server computing device(s) 105 via public network 120 (such as the Internet). In some embodiments, computing device 130 can access other computing devices via network 120. For example, computing device 130 can retrieve documents from another computing device (not shown) via network 120 and upload the retrieved documents to server computing device(s) 105 for printing at multi-function printer 140. In some embodiments, computing device 130 is not on the same local network (e.g., local network 125) as multi-function printer 140.

Computing devices 130 and 160 can access printing services 110 via respective printing services clients 134 and 164. In particular, by running printing services client 134 (or 164) on computing device 130 (or 160), a user can access printing services 110 to have jobs executed on one or more managed printing devices, such as multi-function printer 140. Printing services client 134 (or 164) can allow computing device 130 (or 160) to login, retrieve job accounting information about one or more particular jobs, retrieve usage reports and/or job accounting information for a particular user, and/or execute jobs on one or more managed printing devices.

Printing services client 134 (or 164) can enable execution of various tasks on the managed printing devices via server computing device(s) 105. First, printing services client 134 (or 164) can enable computing device 130 (or 160) to login to printing services 110 and/or server computing device(s) 105. The login information can be provided to identity provider 108 and can include a user name, a password, Global Positioning System (GPS) data, and/or an IP address. Identity provider 108 can use the login information to determine if a user is authorized to access multi-function printer 140 to execute jobs. In particular, server computing device(s) 105 can store a printer-access database indicating which users and/or computing devices can execute jobs on which printing devices. The login information can indicate a particular user and/or computing device that identity provider 108 can use in a query against the printer-access database and the query response can be used to determine if the particular user and/or computing device can access a particular printing device, such as multi-function printer 140. Thus, identity provider 108 can determine if the received login information indicates that a particular user is authorized to execute a job on a particular printing device.

Printing services client 134 (or 164) allows execution of various jobs available to a multifunction printer using server computing device(s) 105. The different types of jobs include pull printing, direct printing, scanning, copying, faxing, scanning to a memory storage, uploading documents to a server and printing, and/or other functions performed by a multifunction printing device.

The system can allow computing device 130 or 160 to execute jobs on one or more managed printing devices. Although not shown in FIG. 1, multiple printing devices can be present on a local network, such as local network 125, or on multiple local networks. Computing device 130 or 160 can request one or more particular printing devices by providing corresponding printing device identifiers to server computing device(s) 105. For example, computing device 130 can obtain identifier 148 using camera 132 or RFID/NFC sensor(s) 136 and then provide identifier 148 of multi-function printer 140 to server computing device(s) 105 via network 120 to execute a job on multi-function printer 140. Other techniques for obtaining identifier 148 are possible as well.

For example, computing device 130 can use the camera 132 to obtain image data of a QR code on multi-function printer 140 that serves as the identifier 148. In other embodiments, the identifier 148 can be a QR code, a barcode, text that can be recognized by an optical character recognizer, or some other type of printing device identifier. Computing device 130 can indicate a requested printing device to server computing device(s) 105 using some other method. Once the printing device identifier 148 is received, server computing device(s) 105 can determine if a user and/or a computing device is authorized to execute jobs on multi-function printer 140. As another example, computing device 130 can use RFID/NFC sensor(s) 136 to read or otherwise access identifier 148 that is stored in an RFID device and/or an NFC device. In other embodiments, computing device 160 can be configured with a camera and/or RFID/NFC sensor(s) as well.

Printing services clients 134, 164 enable retrieval and display of usage information. For example, printing services client 134 or 164 can send a request for usage information about a user and/or a computing device (e.g. computing device 130 or 160) to printing services 110. In response, printing services 110 can receive the request for usage information and send usage information about a user, device, or other entity to the computing device that sent the request, which can then be displayed; e.g., via a graphical user interface. The usage information can indicate job accounting information for one or more jobs executed by a user and/or a computing device, error information for one or more jobs executed by a user and/or a computing device, as well as reasons for a user and/or a computing device not being granted access to one or more printing devices. In some embodiments, more, less, and/or different information can be provided by to a computing device by printing services 110.

As mentioned above, printing services client 134 or 164 can provide job accounting information for one or more particular jobs. The job accounting information can include characteristics and/or properties about one or more particular jobs. For example, the job accounting information can include one or more counters that indicate the number of sheets used, the number of color sheets generated, the number of black and white sheets generated, the amount of ink used, the time of day of the execution of the job, the duration time of the job, the cost of the job, and/or other information. Error information about a particular job can also be provided by printing services 110 to a computing device. In some embodiments, the computing device can receive other information from printing services 110 about one or more particular jobs.

Multi-function printer 140 can be a multifunction printer that can execute various types of jobs. Multi-function printer 140 can execute pull printing jobs, direct print jobs, scan jobs, copy jobs, fax jobs, and/or other types of jobs executed by a printing device.

FIG. 1 shows multi-function printer 140 includes device monitoring and locking interface 145 and identifier 148. Device monitoring and locking interface 145 allows the printer locking device 150 to restrict access to multi-function printer 140. Multi-function printer 140 can execute a job after authorization by the printer locking device 150 via device monitoring and locking interface 145. In other embodiments, access to multi-function printer 140 can be restricted using other methods.

Multi-function printer 140 can include an identifier 148 to distinguish multi-function printer 140 from other printing devices that can be managed by server computing device(s) 105. The identifier 148 can be a QR code, a barcode, text that can be recognized by an optical character recognizer, embedded in an RFID tag or NFC device, and/or use another identification technique that can enable identifier 148 to be obtained by a computing device. For example, computing device 130 can rely on camera 132 to obtain image data of identifier 148. As another example, computing device 130 can rely on RFID/NFC sensor(s) 136 to obtain identifier 148 from an RFID device and/or NFC device associated with (e.g., attached to) multi-function printer 140. Other methods for identifying multi-function printer 140 can also be used.

In some embodiments, server computing device(s) 105 can be associated with a printing manufacturing entity, where the printing manufacturing entity is, owns, manages, represents, and/or corresponds to an entity that built some or all of the printing devices in networks 120 and/or 125; e.g., multi-function printer 140. Alternatively, printing devices in networks 120 and/or 125 can be manufactured by one or more other entities that differ from the printing manufacturing entity.

Multi-function printer 140 can be connected to local network 125. Multi-function printer 140 can communicate with other devices on local network 125, such as computing device 160. Multi-function printer 140 can also be in communication with the printer locking device 150 via interface 145. In other embodiments, the printing device can be in communication with more, fewer, and/or different computing devices than those displayed in FIG. 1. Further, multi-function printer 140 can be connected to more, fewer, and/or different networks than those displayed in FIG. 1. Although FIG. 1 only displays one multi-function printer 140 on local network 125, in other embodiments, a local network 125, or multiple local networks, can have more than one multifunction printer printing device connected to the network(s).

FIG. 1 shows that printer locking device 150 includes MFP connector 152, network connector 153, and printing services client 154. Printer locking device 150 can restrict access by computing devices to multi-function printer 140. Printer locking device 150 can be coupled to multi-function printer 140 via MFP connector 152. MFP connector 152 can couple to device monitoring and locking interface 145 to allow printer locking device 150 to restrict or enable access to multi-function printer 140. The printer locking device 150 can include network connector 153 to allow the device 150 to connect to one or more networks, such as public network 120, local network 125, and/or other networks.

Printer locking device 150 can communicate with server computing device(s) via network 120. For example, identity provider 108 can transmit messages to printer locking device 150 to enable or "unlock" multi-function printer 140 to execute a job for an authorized user, computing device, or other entity and/or to disable or "lock" multi-function printer 140 to stop execution of a job for an unauthorized user, computing device, or other entity.

In particular, identity provider 108 can determine that a user, computing device, and/or other entity are authorized to use multi-function printer 140 to execute a job. Then, identity provider 108 can transmit a message to printer locking device 150 indicating that multi-function printer 140 should be enabled to execute the requested job. In other examples, identity provider 108 can determine that a user, computing device, and/or other entity are not authorized to use multi-function printer 140 to execute a job. Then, identity provider 108 can transmit a message to printer locking device 150 indicating that multi-function printer 140 should be disabled to stop execution of the requested job. Thus, server computing device(s) 105 and printer locking device 150 can ensure secure execution of jobs by multi-function printer 140; that is, only authorized users, devices, and/or entities can execute jobs on multi-function printer 140.

Computing device 160 can access and retrieve information from multi-function printer 140. Computing device 160 can also provide information to server computing device(s) 105. Computing device 160 can further assist with executing jobs at multi-function printer 140. Computing device 160 can be a stationary computing device, such as a desktop. Computing device 160 can be connected to a local network 125 and communicate with other devices on local network 125, such as multi-function printer 140. In some cases, computing device 160 can communicate with printer locking device 150 when device 150 is connected to local network 125. Additionally, computing device can communicate with server computing device(s) 105 via public network 120. In other embodiments, computing device 160 can communicate with more, fewer, and/or different computing devices and/or printing devices than those displayed in FIG. 1. Further, computing device 160 can connect to more, fewer, and/or different networks than those displayed in FIG. 1.

Computing device 160 can be used to assist with executing jobs at multi-function printer 140. For example, computing device can include document applications 162 (e.g., a text editor) that can allow the user to modify and/or configure a document before requesting a print job (or some other type of multifunction printer job) for the document by multi-function printer 140. Computing device 160 can also include printing services client 164 to provide a user interface at computing device 160 for a user to execute jobs at multi-function printer 140.

Printer application 166 can assist server computing device(s) 105 with determining job accounting information. In particular, counter accounting services 112 of printing services 110 can generate a request for job accounting information for one or more particular jobs and send the request to printer application 166 of computing device 160. Because computing device 160 can communicate with multi-function printer 140 via local network 125, printer application 166 can request job accounting information for the one or more particular jobs from multi-function printer 140 and provide the retrieved job accounting information to counter accounting services 112 of via public network 120. Because server computing device(s) 105 can be disconnected from and/or not be connected to local network 125, computing device 160 can obtain job accounting information from multi-function printer 140 that may not be available to server computing device(s) 105. In some embodiments, server computing device(s) 105 can obtain job accounting information from multi-function printer 140 via network 120. In other embodiments, printer application 138 can perform the same functionality on computing device 130 as described herein with regards to printer application 166 on computing device 160. Computing devices 130 and 160 can complete more, fewer, and/or different tasks than those described above.

In addition to determining job accounting information, server computing device(s) 105 can use external IP addresses of the printer locking device 150, computing device 130, and/or computing device 160 to improve security and simplify user setup. Server computing device(s) 105 can use external IP addresses to determine an approximate geographic location of the printer locking device 150, computing device 130, and/or computing device 160. In some embodiments, a geographic location corresponding to a particular IP address can be determined by server computing device(s) 105 by querying a geolocations database indicating geographic locations of IP addresses for the particular IP address.

Thus, server computing device(s) 105 can detect an unsecure or unauthorized attempt to access multi-function printer 140 when a computing device (e.g., either computing device 130 or 160) attempts to use the printing device identifier 148 in a geographic area that is different from printer locking device 150. For example, printing services 110 can determine that a computing device is located in Illinois and a printer locking device 150 for a multi-function printer 140 is located in California. If printing services 110 detects that the computing device in Illinois is attempting to access the printer locking device in California to execute a copy job, the printing services 110 can determine this activity to be unsecure and prevent authorization of the computing device. In this way, external IP addresses can improve security of the system.

Additionally, printing services 110 can use the geographic locations determined from the external IP addresses to assign user(s) and/or computing devices to multi-function printer 140. In particular, if a computing device's geographic location is the same or nearby a geographic location of printer locking device 150 for multi-function printer 140, then multi-function printer 140 can be assigned to the computing device by printing services 110. For example, when computing device 130 scans identifier 148 of multi-function printer 140, printing services 110 can determine the geographic locations of computing device 130 and the printer locking device 150 corresponding to multi-function printer 140 identified by identifier 148. Next, printing services 110 can determine other users and/or computing devices in the same or a nearby geographic location as the printer locking device 150. Printing services 110 can assign these users and/or computing devices to multi-function printer 140.

As another example, when computing device 160 uses multi-function printer 140 to perform a print job, printing services 110 can use external IP addresses of the printer locking device 150 and computing device 160 (and/or other information, such as GPS data) to determine the geographic location(s) of multi-function printer 140 and computing device 160, respectively. Printing services 110 can then determine computing devices and perhaps users in the same or a nearby geographic location as the printer locking device 150. Multi-function printer 140 can then be assigned by the printing services 110 to computing device(s) determined to be in the same or a nearby geographic location as the printer locking device 150. In these ways, set up of the system for executing print jobs on a printing device using a server can be simplified for a user.

Figure 2:
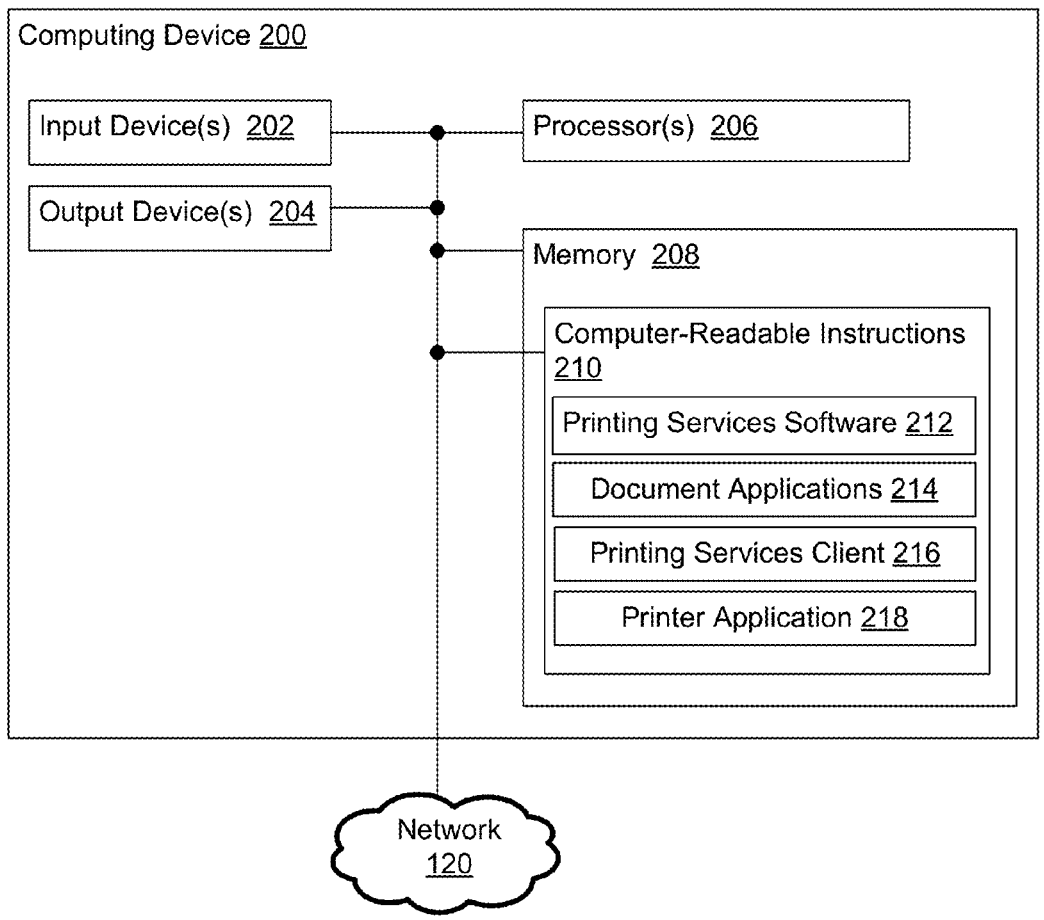
FIG. 2 is a schematic block diagram illustrating a computing device, according to an example embodiment.

FIG. 2 is a schematic block diagram illustrating computing device 200, according to an example embodiment. In some embodiments, computing device 200 can perform one or more herein-described functions of server computing device(s) 105, network 120, local network 125, computing devices 130, 160, multi-function printer 140, printer-locking device 150, user interface 800, method 900, and/or part or all of the entire herein-described functionality related to communication flow sequences 300, 400, 500, 600, and 700.

Computing device 200 can include one or more input devices 202, one or more output devices 204, one or more processors 206 and memory 208. Input devices 202 can include user input devices, network input devices, sensors, and/or other types of input devices. For example, input devices 202 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of networks 120 and/or 125, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of networks 120 and/or 125 (not displayed). Sensors can include devices configured to measure conditions in an environment of computing device 200 and provide data about that environment (such as location data). Example sensors include, but are not limited to, GPS sensor(s), RFID sensor(s), NFC sensor(s), location sensors(s), camera(s), light sensor(s), infrared sensor(s), and microphone(s). Other input devices 202 are possible as well.

Output devices 204 can include user display devices, audible output devices, network output devices, and/or other types of output devices. User display devices can include one or more printing components, liquid crystal displays (LCD), light emitting diodes (LEDs), lasers, displays using digital light processing (DLP) technology, cathode ray tubes (CRT), light bulbs, and/or other similar devices. Audible output devices can include a speaker, speaker jack, audio output port, audio output device, headphones, earphones, and/or other similar devices. Network output devices can include wired network transmitters and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of networks 120 and/or 125, and/or wireless network transmitters and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of networks 120 and/or 125. Other types of output devices can include, but are not limited to, vibration devices, haptic feedback devices, and non-visible light emission devices; e.g., devices that emit infra-red or ultra-violet light. Other output devices 204 are possible as well.

Processors 206 can include one or more general purpose processors, central processing units (CPUs), CPU cores, and/or one or more special purpose processors (e.g., graphics processing units (GPUs), digital signal processors (DSPs), field programmable gated arrays (FPGAs), application specific integrated circuits (ASICs), etc.). Processors 206 can be configured to execute computer-readable program instructions 210 that are contained in memory 208 and/or other instructions as described herein.

Memory 208 can include non-transitory machine-readable storage configured to store data and/or instructions. In particular, memory 208 can store machine-readable instructions 210 that, when executed by processor(s) 206, can cause a computing device to perform functions, such as but not limited to, functions of herein-described devices, networks, methods, features, and scenarios. In particular, machine-readable instructions 210 can include instructions for herein-described printing service software 212, which can be performed by server computing device(s) 105.

These examples of a computing device are provided for illustrative purposes. In addition to and/or alternatively to the examples above, other combinations and/or sub-combinations of printer and computer technologies can also exist, amongst other possibilities, without departing from the scope of the embodiments herein.

Example Communication Flow Diagrams

Figure 3A:
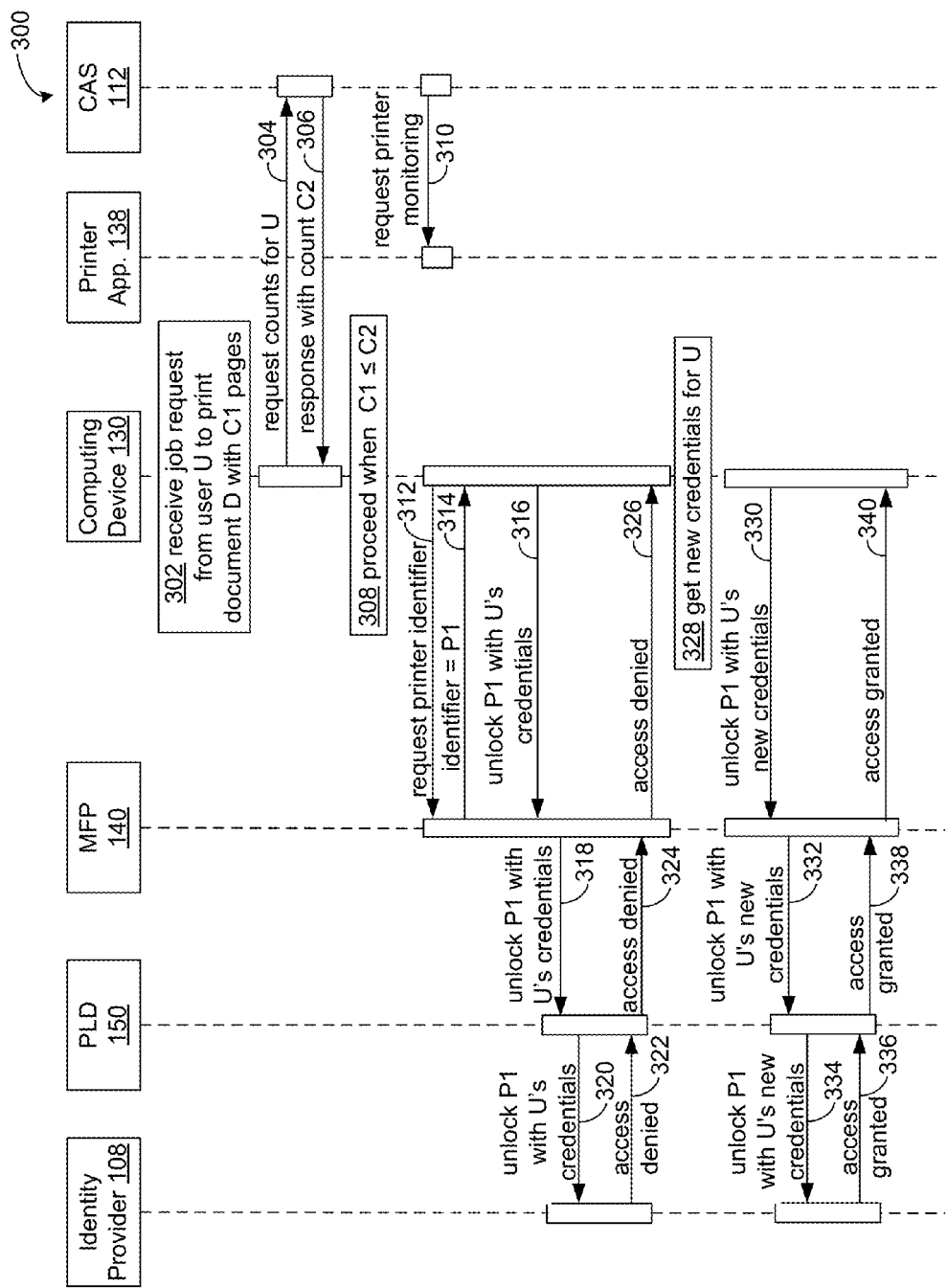
FIGS. 3A and 3B are diagrams illustrating a communication flow for a print job, according to an example embodiment.
Figure 3B:
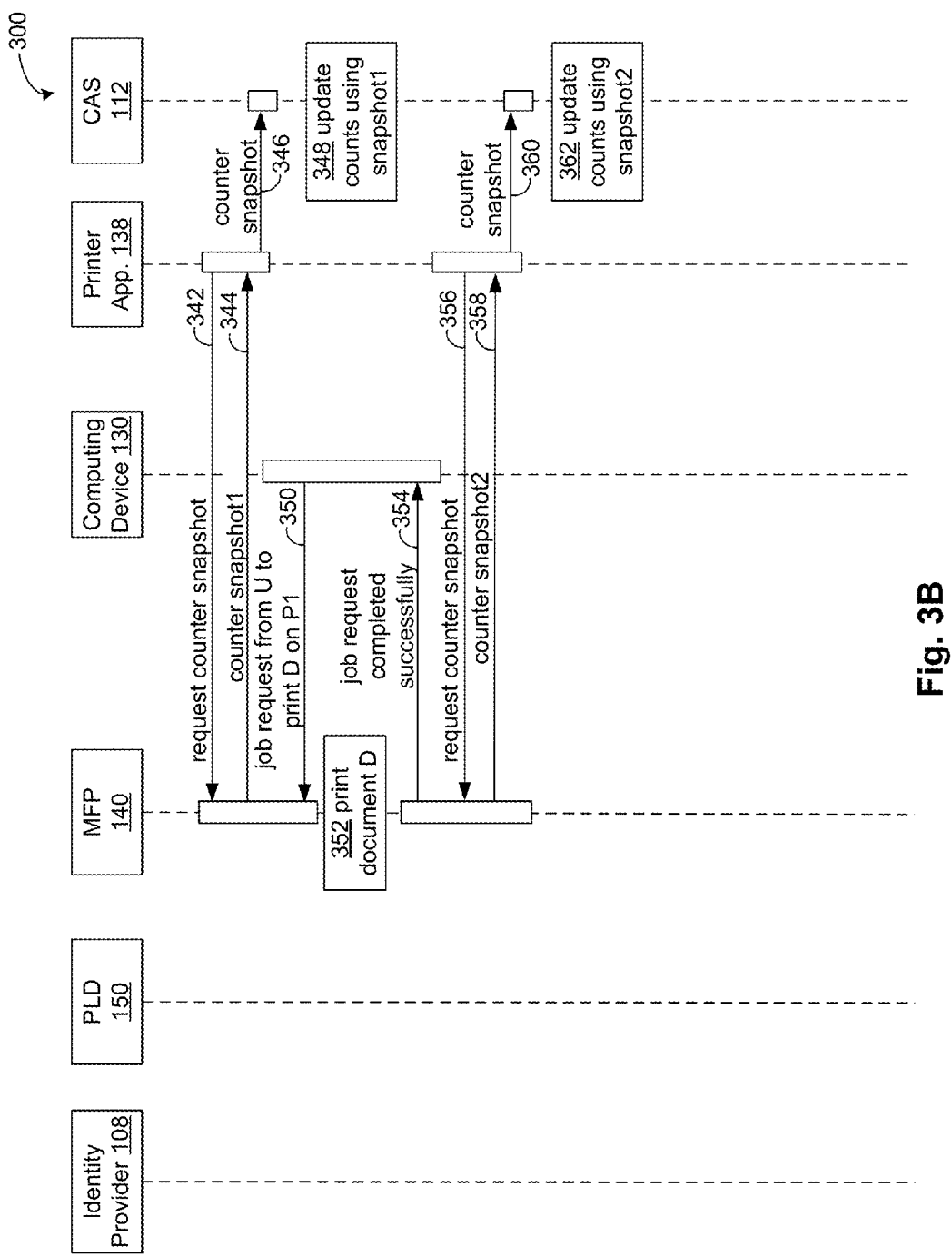

FIGS. 3A and 3B are diagrams illustrating communication flow sequence 300 for a print job, according to an example embodiment. Sequence 300 can involve a job request for a user U to print a document D having C1 pages (C1>0) on multi-function printer 140. Before the job request is sent, credentials for user U are provided to printer locking device (PLD) 150 and identity provider 108 to unlock multi-function printer 140. Once printer locking device 150 unlocks multi-function printer 140, computing device 130 sends the job request to multi-function printer 140, which prints document D as indicated in the job request. Sequence 300 also involves printer application 138 executing on computing device 130 to monitor multi-function printer 140 on behalf of counter accounting service (CAS) 112.

Sequence 300 can include identity provider 108, counter accounting service 112, computing device 130, printer application 138, multi-function printer 140, and printer locking device 150. In other examples, another computing device, such as computing device 160, can replace computing device 130 in sequence 300. In still other examples, other printer applications, such as printer application 166 of computing device 160, can replace printer application 138 in sequence 300. In some embodiments, sequence 300 can use more, fewer, and/or different devices and/or software modules than those mentioned above. Additionally, sequence 300 can occur in a different order than the order displayed.

Sequence 300 can begin at block 302, where computing device 130 receives input related to a job request from user U to print document D having C1 (C1>0) pages on multi-function printer 140. In response to the input received at block 302, computing device 130 sends, at block 304, a message to counter accounting service 112 requesting one or more counts from counter accounting service 112. The one or more counts can include a count C2 of a number of pages that user U and/or computing device 130 can print on multi-function printer 140. At block 306, counter accounting service 112 sends a message to computing device 130 that provides the requested count C2.

At block 308, computing device 130 determines if count C1 is less than or equal to count C2; that is, if count C2 indicates that user U and/or computing device 130 has been budgeted with enough pages to print document D on multi-function printer 140. In sequence 300, C1 is less than C2, indicating that user U and/or computing device 130 have been budgeted with enough pages to print document D on multi-function printer 140.

Sequence 300 can continue at block 310 with counter accounting service 112 sending a message to printer application 138 to request monitoring of multi-function printer 140. In response, printer application 138 can begin polling multi-function printer 140 for job accounting data, such as one or more counters that indicate: a number of pages used, a number of color pages generated, the number of black and white pages generated, a number of pages printed, a number of pages scanned, a number of pages faxed, a number of pages copied, a number of color-printed pages, a number of black-and-white-printed pages, a number of color-copied pages, a number of black-and-white-copied pages, one or more amounts of ink(s) (or other colorant(s)) used, a time of day for execution of a job, a duration of a job, a cost of a job, and/or other counters. Other data can be included in job accounting data as well.

Printer application 138 can poll multi-function printer 140 for job accounting information by sending a request for job accounting information to multi-function printer 140 on a periodic (e.g., every 15 minutes, hourly, twice a day, daily, weekly, monthly, annually) and/or another basis (e.g., after a computing device has executed a pre-determined number (such as 1, 3, 5, 10, 20, or some other number) of jobs, after either a pre-determined amount of time has expired or a pre-determined number of jobs has been executed). In sequence 300, once counter accounting service 112 sends the message to request monitoring of multi-function printer 140, then counter accounting service 112 does not send another message to printer application 138; rather, counter accounting service 112 relies upon printer application 138 to request job accounting data from multi-function printer 140.

FIG. 3 shows that computing device 130 can, at block 312, request a printer identifier for multi-function printer 140, and at block 314, computing device 130 can obtain printer identifier "P1" for multi-function printer 140. In some embodiments, computing device 130 can use camera 132 at block 312 to obtain image data, such as a bar code or QR code, associated with the printer identifier—then, at block 314, computing device 130 can process the image data to obtain the printer identifier "P1". In other embodiments, computing device 130 can use RFID/NFC sensor(s) 136 at block 132 to read an RFID device and/or NFC device associated with multi-function printer 140—then, at block 314, computing device 130 can receive the printer identifier "P1" from the RFID device and/or NFC device. In still other embodiments, at block 312, computing device 130 can send a message to multi-function printer 140 requesting the printer identifier—and, at block 314, multi-function printer 140 can send a message with the requested printer identifier "P1". In particular of these embodiments, the message requesting the printer identifier can be a broadcast message sent by computing device 130 requesting identification of all printers receiving the broadcast message (which in this example includes multi-function printer 140). Using broadcast messages can allow computing device 130 to send a message requesting a printer identifier before actually identifying a specific printing device. Other techniques for obtaining printer identifiers are possible as well.

Sequence 300 continues at block 316 with computing device 130 obtaining credentials for user U and sending a message to multi-function printer 140 requesting that printer P1 be unlocked to be accessed by user U based on the credentials obtained for user U. The credentials can include a user name for user U, a password for user U, a key for user U, a token for user U, and/or other information identifying and/or authenticating an identity and/or access rights of user U. In some embodiments, the credentials can be partially or completely encrypted; e.g., an encrypted copy of U's password can be provided with the credentials.

At block 318, multi-function printer 140 communicates the message requesting that printer P1 be unlocked to be accessed by user U based on the credentials obtained for user U to printer locking device 150, which is a printer locking device configured to lock and unlock multi-function printer 140. At block 320, printer locking device 150 communicates the message requesting that printer P1 be unlocked to be accessed by user U based on the credentials obtained for user U to identity provider 108.

At block 322, identity provider 108 examines the credentials obtained for user U, determines that the credentials do not enable user U to access multi-function printer 140, and sends a message to printer locking device 150 indicating that user U has been denied access to printer P1. At block 324, printer locking device 150 sends the message denying access to printer P1 to multi-function printer 140. At block 326, multi-function printer 140 sends the message denying access to printer P1 to computing device 130.

At block 328, computing device 130 receives the message denying access to printer P1. In some embodiments, upon reception of the message denying access to printer P1, computing device 130 can display information indicating that access to printer P1/multi-function printer 140 has been denied.

After receiving the message denying access to printer P1, computing device 130 can obtain new credentials for user U.

In some embodiments, the new credentials for user U can include some or all of the credentials obtained at block 316; e.g., a user name, a password, etc. In other embodiments, computing device 130 can prompt user U for new credentials; e.g., request re-entry of a user name and/or a password. In even other embodiments, computing device 130 can retrieve the new credentials from data storage associated with user U; e.g., retrieve a key, token, and/or other credentials from one or more files, such as a profile, associated with user U. In still other embodiments, computing device 130 can request the new credentials from another computing device and then receive the new credentials from the other computing device; e.g., receive a key, token, and/or other credentials associated with user U.

Sequence 300 continues at block 330, where computing device 130 sends a message to multi-function printer 140 requesting that printer P1 be unlocked to be accessed by user U based on the new credentials obtained for user U at block 328. At block 332, multi-function printer 140 communicates the message requesting that printer P1 be unlocked to be accessed by user U based on the new credentials obtained for user U to printer locking device 150, which is a printer locking device configured to lock and unlock multi-function printer 140. At block 334, printer locking device 150 communicates the message requesting that printer P1 be unlocked to be accessed by user U based on the new credentials obtained for user U to identity provider 108.

At block 336, identity provider 108 examines the new credentials obtained for user U, determines that the new credentials do enable user U to access multi-function printer 140, and sends a message to printer locking device 150 indicating that user U has been granted access to printer P1. At block 338, printer locking device 150 sends the message granting access to printer P1 to multi-function printer 140.

At block 340, multi-function printer 140 sends the message granting access to printer P1 to computing device 130. In some embodiments, upon reception of the message granting access to printer P1, computing device 130 can display information indicating that access to printer P1/multi-function printer 140 has been granted.

Sequence 300 continues with block 342 shown in FIG. 3B, where printer application 138 can request a counter snapshot and perhaps other job accounting information from multi-function printer 140. The counter snapshot can include the values of one or more counters maintained by multi-functional printer 140, such as discussed above in the context of block 310. At block 344, multi-function printer 140 can obtain the requested job accounting data as a counter snapshot and send a response including the counter snapshot to printer application 138. At block 346, printer application 138 can send the counter snapshot to counter accounting service 112. At block 348, counter accounting service 112 can process and/or store the counter snapshot received at block 346 as job accounting data associated with printer P1/multi-function printer 140; for example, counter accounting service 112 can update one or more counters associated with printer P1/multi-function printer 140 based on the information in the counter snapshot received at block 346.

FIG. 3B shows that sequence 300 continues at block 350 with computing device sending a job request message to multi-function printer 140 to print document D on printer P1 on behalf of user U. At block 352, multi-function printer 140 prints document D, and at block 354, multi-function printer 140 sends a message to computing device 130 indicating that the job requested at block 350 has been completed successfully.

Sequence 300 continues with block 356, where printer application 138 can request a counter snapshot and perhaps other job accounting information from multi-function printer 140, such as discussed above in the context of block 342. At block 358, multi-function printer 140 can obtain the requested job accounting data as a counter snapshot and send a response including the counter snapshot to printer application 138, such as discussed above in the context of block 344. At block 360, printer application 138 can send the counter snapshot to counter accounting service 112, such as discussed above in the context of block 346. At block 362, counter accounting service 112 can process and/or store the counter snapshot received at block 360 as job accounting data associated with printer P1/multi-function printer 140, such as discussed above in the context of block 348. In particular, since the job accounting data in the counter snapshot received at block 360 includes accounting data for the job request to print document D for user U sent at block 350 of sequence 300, the job accounting data associated with printer P1/multi-function printer 140 has been updated based at least in part based on the job request to print document D for user U. Upon completion of block 362, sequence 300 can end.

Figure 4:
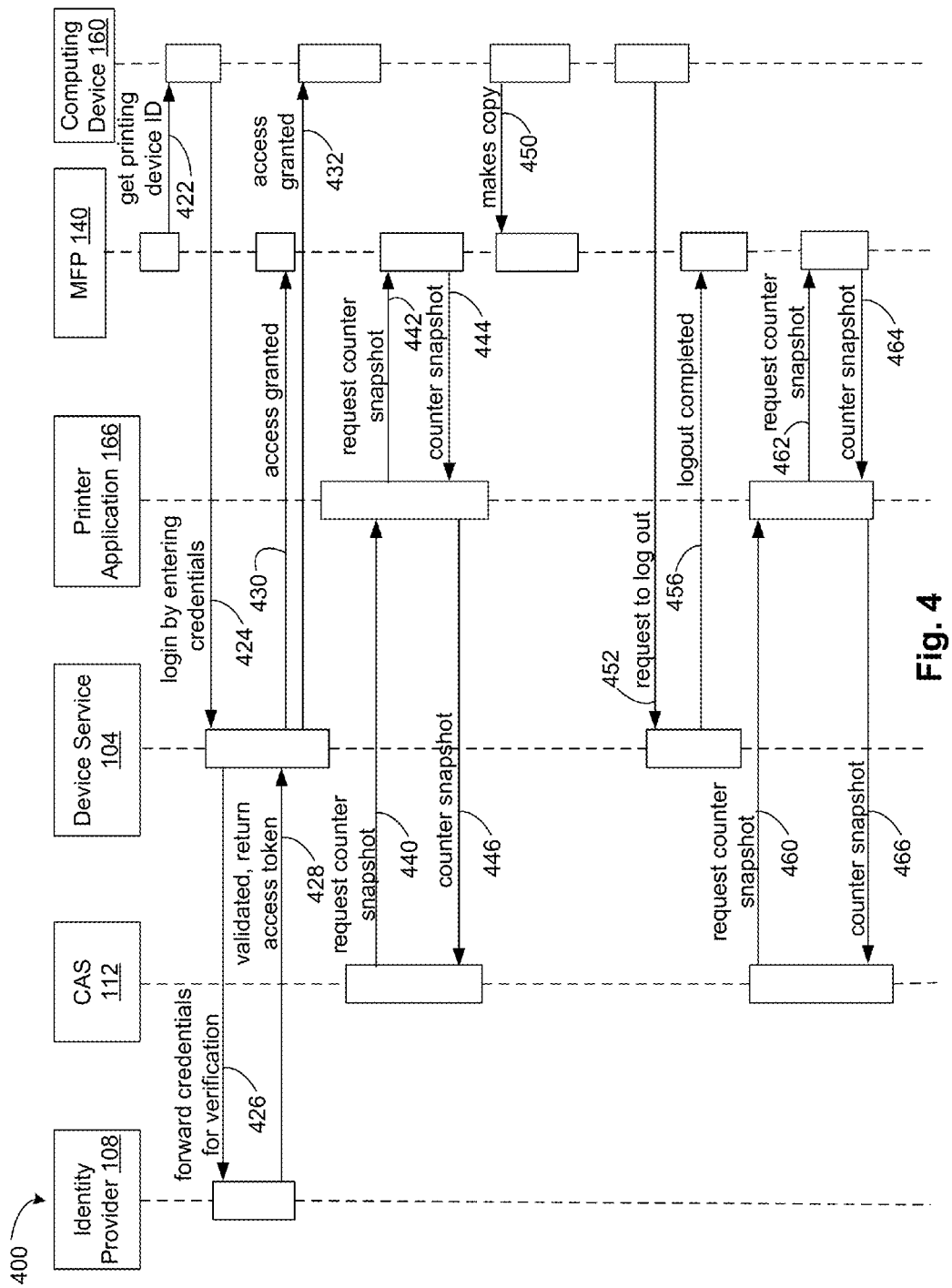
FIG. 4 is a diagram illustrating a communication flow for a copy job, according to an example embodiment.

FIG. 4 is a diagram of a communication flow sequence 400 for executing a copy job. Sequence 400 can involve a job request to have multi-function printer 140 make a copy. Before the copy is made, computing device 160 logs in with identity provider 108 for authorization to use multi-function printer 140. After identity provider 108 validates credentials associated with computing device 160 provided at login, multi-function printer 140 makes the requested copy and computing device 160 logs out. Sequence 400 also involves printer application 166 executing on computing device 160 to monitor multi-function printer 140 on behalf of counter accounting service 112.

Sequence 400 can include device service 104, identity provider 108, counter accounting service 112, multi-function printer 140, computing device 160, and printer application 166. In other examples, another computing device, such as computing device 130, can replace computing device 160 in sequence 400. In still other examples, other printer applications, such as printer application 138 of computing device 130, can replace printer application 166 in sequence 400. In some embodiments, the sequence 400 can use more, fewer, and/or different devices and/or software modules than those mentioned above. Additionally the sequence 400 can occur in a different order than the order displayed.

Sequence 400 can begin at block 422 with computing device 130 obtaining a printing device identifier from multi-function printer 140. For example, computing device 160 can obtain identifier 148 from multi-function printer 140. In some embodiments, identifier 148 can be encoded or otherwise available from a QR code, a barcode, or text, and then, computing device 160 can obtain identifier 148 from multi-function printer 140 using a camera to take an image of identifier 148 and determine the printing device identifier from the image. In other embodiments, identifier 148 can be readable or otherwise available from an RFID device, a NFC device, and/or similar device(s), and then, computing device 160 can obtain identifier 148 from multi-function printer 140 using one or more RFID/NFC sensors(s). Other techniques are possible for obtaining identifier 148.

Sequence 400 can continue at block 424 where a user can login by entering credentials at computing device 160 for verification. The credentials for verification can include a user login, a user name, a user password, GPS data indicating the location of the user and/or of computing device 160, an IP address of computing device 160, and/or other information indicating the user and/or computing device 160. The user can enter credentials for verification using user interface for printing services client 164 of computing device 160. The credentials for verification can be transmitted from computing device 160 via network 120 to device service 104. In some embodiments, the credentials for verification can include the printing device identifier obtained at block 422; e.g., identifier 148. Other techniques for obtaining credentials for verification and/or logging in are possible as well.

At block 426, device service 104 can forward the credentials for verification by identity provider 108. For example, identity provider 108 can determine whether a user and/or a computing device can access a printing device based on the credentials for verification. Identity provider 108 can utilize a database and/or other data structure(s) that store(s) login information (e.g., username, password, and/or printing device identifier) with corresponding users and/or computing devices. The database can indicate access rights provided to a particular user and/or a particular computing device for one or more printing devices. Identity provider 108 can query the database with the received credentials for verification to determine whether computing device 160 can access multi-function printer 140. In some embodiments, computing device 160 can send credentials for verification directly to identity provider 108, thereby bypassing device service 104.

Once identity provider 108 has determined that computing device 160 is authorized to access multi-function printer 140, sequence 400 can continue at block 428 where identity provider 108 sends a validated return access token to device service 104. Once received, device service 104 can, at block 430, indicate access has been granted to multi-function printer 140, and then send, at block 432, a message to notify computing device 160 that access has been granted to multi-function printer 140. In some embodiments, device service 104 can indicate access has been granted to multi-function printer 140 by transmitting a message (e.g., an "enable" message or an "unlock" message) to printer locking device 150. Once received, printer locking device 150 can enable multi-function printer 140 to execute jobs received from computing device 160. In still other embodiments, the message notifying computing device 160 that access has been granted to multi-function printer 140 can include the return access token discussed above in the context of block 428—then, the return access token may be presented to indicate computing device 160 has been authorized to access multi-function printer 140.

In combination, the techniques of blocks 422-432 can be used as an authorization process for sequence 400. In some embodiments, the authorization process for sequence 400 can include more, fewer, and/or different blocks than those displayed in FIG. 4. In some embodiments, blocks of the authorization process for sequence 400 can be executed in a different order than displayed in FIG. 4. In other embodiments, the same authorization process or a similar authorization process for sequence 400 can be used in other herein-described communication flow sequences, such as sequences 500 and 700. Other techniques for authorizing a user and/or a computing device to access a printing device are possible as well.

Sequence 400 can continue at block 440, where counter application service 112 sends a message to printer application 166 requesting a counter snapshot (and perhaps other job accounting information) from multi-function printer 140. The counter snapshot can include the values of one or more counters maintained by multi-functional printer 140, such as discussed above in the context of block 310 of sequence 300. At block 442, printer application 166 can send a request for the counter snapshot to multi-functional printer 140. At block 444, multi-function printer 140 can send a message to printer application 166 that includes the requested counter snapshot. Then, at block 446, printer application 166 can send the counter snapshot to counter accounting service 112.

Sequence 400 can continue at block 450 where a copy is made using a user interface to multi-function printer 140 that is provided by computing device 160. In some embodiments, the copy can be made using a user interface provided directly by multi-function printer 140. In other embodiments, the user interface to multi-function printer 140 provided by computing device 160 can be specifically provided by printing services client 164 of computing device 160.

At block 452, computing device 160 can send device service 104 a request to logout from multi-function printer 140. In some embodiments, computing device 160 can use printing services client 164 to send the request to logout. At block 456, the request to logout can be granted by device service 104. Then, device service 104 can send a message to multi-functional printer 140 indicating that computing device 160 has logged out. In some embodiments, logging out can be performed using a user interface provided by multi-function printer 140. Other techniques for user logout are possible.

After computing device 160 has logged out, sequence 400 can continue by executing blocks 460, 462, 464, and 466 to determine job accounting information for at least the copy job. At block 460, counter application service 112 sends a message to printer application 166 requesting a counter snapshot (and perhaps other job accounting information) from multi-function printer 140. The counter snapshot can include the values of one or more counters maintained by multi-functional printer 140, such as discussed above in the context of block 310 of sequence 300. At block 462, printer application 166 can send a request for the counter snapshot to multi-functional printer 140. At block 464, multi-functional printer 140 can send a message to printer application 166 that includes the requested counter snapshot. At block 466, printer application 166 can send the counter snapshot to counter accounting service 112.

The technique of blocks 440-446 and 460-466 of sequence 400 to obtain a counter snapshot differs somewhat from the technique used in blocks 310 and 342-346 and blocks 356-360 of sequence 300. In sequence 300, counter accounting service 112 sends one message to printer application 138 at block 310, and in blocks 342 and 356, printer application 138 sends messages to multi-function printer 140 requesting job accounting data. However, in sequence 400, counter accounting service 112 sends a message at each of blocks 440 and 460 that leads to printer application 166 sending, at each of blocks 442 and 462, messages to multi-function printer 140 requesting job accounting data. That is, in sequence 300, the printer application determines when to request job accounting data from multi-function printer 140, while in sequence 400, counter accounting service 112 determines when to request job accounting data from multi-function printer 140.

In some embodiments, other techniques to obtain job accounting information can be used. In other embodiments, the obtained job accounting information can be for the particular job executed. In still other embodiments, the job accounting information obtained can be for multiple jobs executed.

In even other embodiments, the job accounting information obtained during blocks 460, 462, 464, and 466 can be compared with the job accounting information obtained during blocks 440, 442, 444, and 446. As part of the comparison, job accounting information for the particular copy job executed during block 450 can be determined. Job accounting information and/or usage reports for a particular user and/or computing device (e.g., computing device 130 or 160) can be updated to include the job accounting information obtained for a particular job that was executed (e.g., the copy job executed during block 450).

Figure 5:
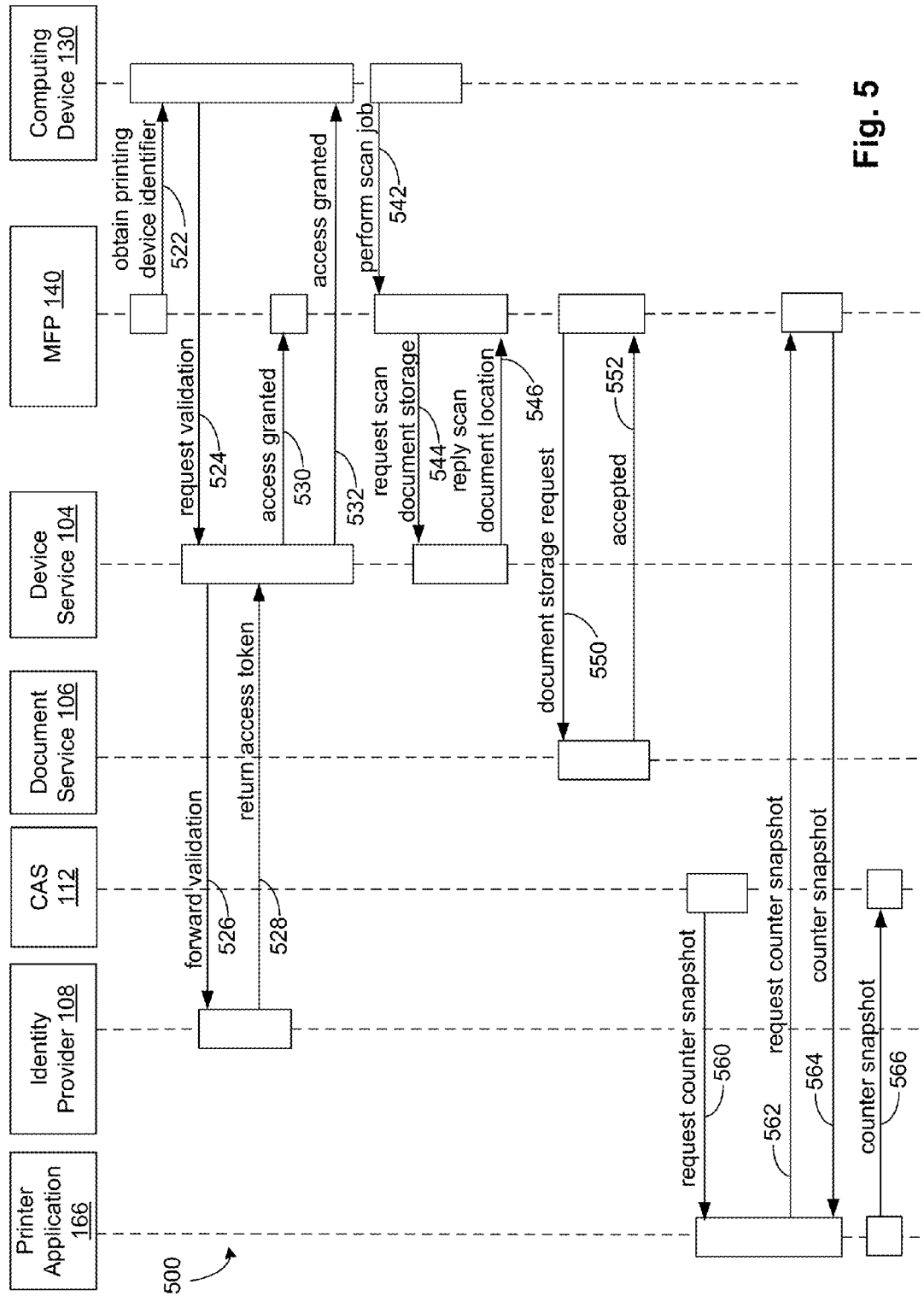
FIG. 5 is a diagram illustrating a communication flow for a scan job, according to an example embodiment.

FIG. 5 is a diagram of a communication flow sequence 500 for executing a scan job. Sequence 500 can involve a job request associated with computing device 130 related to scanning a document with multi-function printer 140. Before the document scan is made, computing device 130 logs in with identity provider 108 for authorization to use multi-function printer 140. After identity provider 108 validates credentials associated with computing device 130 provided at login, multi-function printer 140 makes the requested scan. The scanned document can be stored using document service 106. Sequence 500 also involves printer application 166 executing on computing device 160 to monitor multi-function printer 140 on behalf of counter accounting service 112.

Sequence 500 can include device service 104, document service 106, identity provider 108, counter accounting service 112, computing device 130, multi-function printer 140, and printer application 166. In other examples, another computing device, such as computing device 160, can replace computing device 130 in sequence 500. In still other examples, other printer applications, such as printer application 138 of computing device 130, can replace printer application 166 in sequence 500. In some embodiments, the sequence 500 can use more, fewer, and/or different devices and/or software modules than those mentioned above. Additionally, the sequence 500 can occur in a different order than the order displayed.

Sequence 500 can begin using an authorization process to determine whether the computing device 502 is authorized to access multi-function printer 140 to execute the scan job. The authorization process for sequence 500 can correspond to the authorization process involving blocks 422-432 of sequence 400.

As indicated by FIG. 5, sequence 500 can begin at block 522 with computing device 130 obtaining a printing device identifier from multi-function printer 140—to obtain the printing device identifier, computing device 130 can use techniques similar to those discussed above at block 422 of sequence 400. Sequence 500 can continue at block 524 where a user can login by entering credentials at computing device 130 for verification using techniques similar to those discussed above in the context of block 424 of sequence 400. Once device service 104 has received credentials for verification from computing device 130, sequence 500 can continue at block 526 by device service 104 forwarding the credentials for verification to identity provider 108 using techniques similar to those discussed above in the context of block 426 of sequence 400.

Once identity provider 108 has determined that (the user of) computing device 130 is authorized to access multi-function printer 140, sequence 500 can continue at block 528 where identity provider 108 sends a validated return access token to device service 104 using techniques similar to those discussed above in the context of block 428 of sequence 400. Once received, device service 104 can, at block 530, indicate access has been granted to multi-function printer 140, and then, at block 532, send a message to notify computing device 130 that access has been granted to multi-function printer 140, using techniques similar to those discussed above in the context of blocks 430 and 432 of sequence 400. In some embodiments, the authorization process for sequence 500 can include more, fewer, and/or different blocks than those displayed in FIG. 5. In other embodiments, blocks of the authorization process for sequence 500 can be executed in a different order than displayed in FIG. 5. Other techniques for authorizing a user and/or a computing device to access a printing device are possible as well.

Sequence 500 can continue at block 542, where a scan job can be performed by multi-function printer 140. In one embodiment, the scan job can be performed using a user interface provided by multi-function printer 140. In other embodiments, the scan job can be performed using a user interface to multi-function printer 140 provided by a computing device (e.g., computing device 130 or 160). Once a document has been scanned (as part of the scan job), a file with the contents of the scanned document can be stored by a server (e.g., one or more of server computing device(s) 105). In some embodiments, the scanned document can be stored in some other memory, such as a flash drive, a remote server, computing device 130, computing device 160, or some other memory accessible by multi-function printer 140.

Sequence 500 can continue by storing the scanned document at a server, such as at one or more of server computing device(s) 105. At block 544, multi-function printer 140 can send a message to device service 104 storing requesting storage of the scanned document. At block 546, device service 104 can reply to multi-function printer 140 with an indication of a storage location for the scanned document.

FIG. 5 shows that, at block 550 of sequence 500, multi-function printer 140 can send a request to document service 106 to store the scanned document at the storage location provided at block 546. At block 552, document service 106 can receive the request to store the scanned document (which can also include a copy of the scanned document), store the scanned document at the indicated storage location, and send a message to multi-function printer 140 indicating that the scanned document has been accepted for storage. In other embodiments, more, fewer, and/or different blocks can be executed to store a scanned document.

Sequence 500 can continue by executing blocks 560, 562, 564, and 566 to determine job accounting information for the scan job. In some embodiments, the techniques of blocks 560, 562, 564, and 566 can be similar to the techniques of respective blocks 460, 462, 464, and 466 for determining job accounting information after execution of a copy job.

At block 560, counter application service 112 sends a message to printer application 166 to obtain a counter snapshot (and perhaps other job accounting information) from multi-functional printer 140. The counter snapshot can include the values of one or more counters maintained by multi-functional printer 140, such as discussed above in the context of block 310 of sequence 300. At block 562, printer application 166 can send a request for the counter snapshot to multi-functional printer 140. At block 564, multi-functional printer 140 can send a message to printer application 166 that includes the requested counter snapshot. At block 566, printer application 166 can send the counter snapshot to counter accounting service 112. In some embodiments, other techniques to obtain job accounting information can be used.

In other embodiments, the obtained job accounting information can be for the particular job executed. In still other embodiments, the job accounting information obtained can be for multiple jobs executed.

In even other embodiments, the job accounting information obtained during blocks 560, 562, 564, and 566 can be compared with job accounting information obtained prior to execution of the scan job executed at block 542. During the comparison, job accounting information for the particular scan job executed during block 542 can be determined. Job accounting information and/or usage reports for a particular user and/or computing device (e.g., computing device 130, computing device 160, etc.) can be updated to include the job accounting information obtained for a particular job that was executed (e.g., a scan job executed during block 542).

Figure 6:
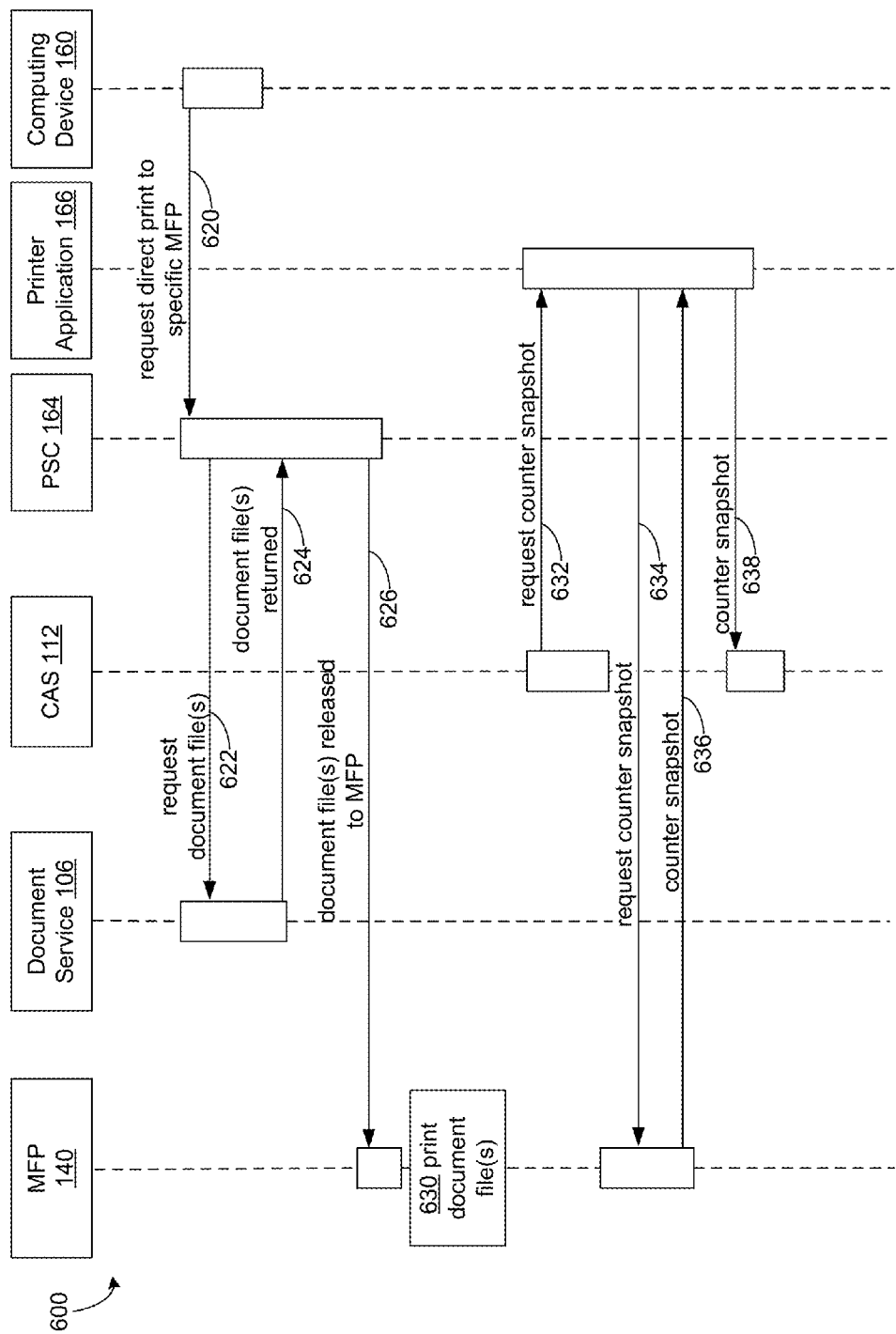
FIG. 6 is a diagram illustrating a communication flow for another print job, according to an example embodiment.

FIG. 6 is a diagram of a communication flow sequence 600 for executing a direct print job. Sequence 600 can involve computing device 160 sending a job request to directly print to a specific multi-functional printer; in this case, multi-function printer 140. Documents for the direct print job are retrieved using document service 106 and then provided to multi-function printer 140 for printing. Sequence 600 also involves printer application 166 executing on computing device 160 to monitor multi-function printer 140 on behalf of counter accounting service 112.

Sequence 600 can include document service 106, counter accounting service 112, multi-function printer 140, computing device 160, printing services client (PSC) 164, and printer application 166. In other examples, another computing device and its related printing services client, such as computing device 130 and printing services client 134, can replace computing device 160 and printing services client 164 in sequence 600. In still other examples, other printer applications, such as printer application 138 of computing device 130, can replace printer application 166 in sequence 600. In some embodiments, the sequence 600 can use more, fewer, and/or different devices and/or software modules than those mentioned above. Additionally, the sequence 600 can occur in a different order than the order displayed.

Sequence 600 can begin at block 620, which can include computing device 160 generating and sending a request to execute a direct print job to printer services client 164, where the request to execute a direct print job both (i) specifies use of multi-function printer 140 to carry out the direct print job and (ii) indicates one or more document files to be printed during the direct print job. For example, the request to execute the direct print job can indicate one or more locations where the one or more document files are stored.

In sequence 600, the requested document files are stored on server computing device(s) 105 and are accessible using document service 106. In other embodiments, the document files can be stored on the computing device 602. Alternatively, the document files can be stored in a memory accessible by computing device 602. For example, the document files can be stored on a flash drive attached to the computing device 602. Alternatively, the document files can be stored on a memory and/or a computing device connected to computing device 602 via a network (e.g., network 120).

At block 622, printer services client 164 can send a request for one or more document files to document service 106. In response, at block 624, document service 106 can retrieve the requested document file(s) and provide them to printer services client 164. Once received, the printer services client 164 can send the document file(s) to multi-function printer 140 at block 628.

In examples where the document file(s) are stored on a memory accessible by computing device 160, at block 622, printer application 166 can retrieve the document file(s) from the memory (examples not shown in FIG. 6). Once the document files are retrieved, printer application 166 can skip blocks 624 and 626 to proceed to block 628 and send the document file(s) to multi-function printer 140. Once the file(s) have been sent to multi-function printer 140, multi-function printer 140 can print the document file(s) at block 630. Other embodiments for executing the direct print job can also be possible.

Sequence 600 can continue by executing blocks 632, 634, 636, and 638 to determine job accounting information at least for the direct print job. The blocks executed can correspond to respective blocks 460, 462, 464, and 466 of sequence 400. At block 632, counter application service 112 sends a message to printer application 166 requesting a counter snapshot (and perhaps other job accounting information) from multi-function printer 140. The counter snapshot can include the values of one or more counters maintained by multi-functional printer 140, such as discussed above in the context of block 310 of sequence 300. At block 634, printer application 166 can send a request for the counter snapshot to multi-functional printer 140. At block 636, multi-functional printer 140 can send a message to printer application 166 that includes the requested counter snapshot. At block 638, printer application 166 can send the counter snapshot to counter accounting service 112.

In some embodiments, the obtained counter snapshot/job accounting information can be for the particular direct print job executed as part of sequence 600. In other embodiments, the obtained counter snapshot/job accounting information can be for multiple jobs executed. In some embodiments, the job accounting information obtained during blocks 632, 634, 636, and 638 can be compared with initial job accounting information obtained (not shown as part of sequence 600) prior to execution of the direct print job at block 630. During the comparison, job accounting information for the particular direct print job executed during block 630 can be determined. Job accounting information and/or usage reports for a particular user and/or computing device (e.g., computing device 130, computing device 160, etc.) can be updated to include the job accounting information obtained for a particular job that was executed (e.g., a direct print job executed during block 630).

In sequence 600, computing device 160 has already been authorized to access multi-function printer 140 to execute the direct print job. As a result, authorization blocks similar to blocks 522-532 of sequence 500 are not displayed in FIG. 6.

However, in other embodiments, computing device 160 or another computing device, such as computing device 130, can execute authorization blocks similar to blocks 522-532 of sequence 500 to grant computing device 160 or another computing device access to multi-function printer 140 at least to execute a direct print job. In these embodiments, document files can be stored using server computing device(s) 105 and/or at a memory accessible server computing device(s) 105—such document files can be provided to multi-function printer 140 or computing device 160 (or another computing device) using document service 106. After computing device 160 sends a request to server computing device(s) 105 for a direct print job of document files to a specific multi-function printer 140 (e.g., block 620 from FIG. 6), the document files can be retrieved and forwarded by the server computing device(s) 105; e.g., using document service 106 to multi-function printer 140 for printing.

In some embodiments, the document files can be stored at a memory accessible by the computing device. For example, the document files can be stored in a flash drive attached to the computing device. Alternatively, the files can be stored by another computing device while still being accessible by the computing device via network 120. Alternatively, the document files can be stored by the computing device.

In these embodiments, the computing device can retrieve document files, upload the document files to server computing device(s) 105, and send a request to print the uploaded document files at multi-function printer 140. After receiving the direct print request and the uploaded files, server computing device(s) 105 can then forward the uploaded document files to multi-function printer 140 for printing. Server computing device(s) 105 can then execute blocks to obtain job accounting information (e.g., blocks 632-638 of sequence 600). Prior to uploading the document files to server computing device(s) 105, the computing device can execute authorization blocks (e.g., blocks 522-532 of sequence 500) to provide access to multi-function printer 140 for the computing device to complete the print job. Other types of jobs can be executed at the printing device.

Figure 7:
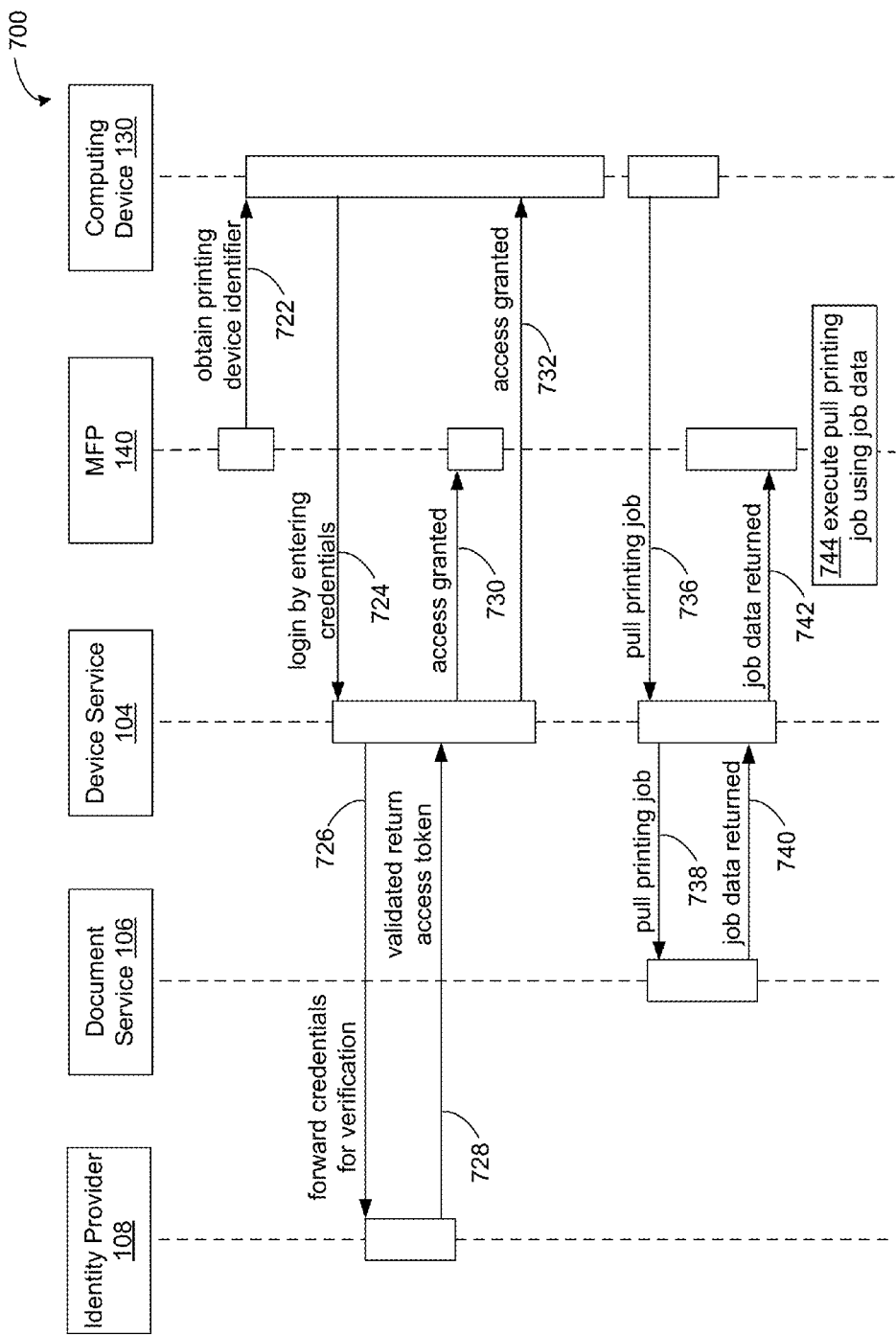
FIG. 7 is a diagram illustrating a communication flow for yet another print job, according to an example embodiment.

FIG. 7 is a diagram of a communication flow sequence 700 for executing a pull printing job. Sequence 700 can involve computing device 130 sending a pull printing job to document service 106, so that document service 106 can obtain documents stored using server computing device(s) 105 and send the obtained documents to multi-function printer 140. Before the pull printing job is sent, computing device 130 logs in with identity provider 108 for authorization to use multi-function printer 140. After identity provider 108 validates credentials associated with computing device 130 provided at login, computing device 130 send the pull printing job to device service 104.

Sequence 700 can include device service 104, document service 106, identity provider 108, computing device 130, and multi-function printer 140. In other examples, another computing device, such as computing device 160, can replace computing device 130 in sequence 400. In some embodiments, sequence 700 can use more, fewer, and/or different devices and/or software modules than those mentioned above. Additionally, the sequence 700 can occur in a different order than the order displayed.

Sequence 700 can begin at block 722 with computing device 130 obtaining a printing device identifier from multi-function printer 140—to obtain the printing device identifier, computing device 130 can use techniques similar to those discussed above at block 422 of sequence 400. Sequence 700 can continue at block 724 where a user can login by entering credentials at computing device 130 for verification using techniques similar to those discussed above in the context of block 424 of sequence 400. Once device service 104 has received credentials for verification from computing device 130, sequence 700 can continue at block 726 by device service 104 forwarding the credentials for verification to identity provider 108 using techniques similar to those discussed above in the context of block 426 of sequence 400.

Once identity provider 108 has determined that (the user of) computing device 130 is authorized to access multi-function printer 140, sequence 700 can continue at block 728 where identity provider 108 sends a validated return access token to device service 104 using techniques similar to those discussed above in the context of block 428 of sequence 400.

Once received, device service 104 can, at block 730, indicate access has been granted to multi-function printer 140, and then, at block 732, send a message to notify computing device 130 that access has been granted to multi-function printer 140, using techniques similar to those discussed above in the context of blocks 430 and 432 of sequence 400. In some embodiments, the authorization process for sequence 700 can include more, fewer, and/or different blocks than those displayed in FIG. 7. In other embodiments, blocks of the authorization process for sequence 700 can be executed in a different order than displayed in FIG. 7. Other techniques for authorizing a user and/or a computing device to access a printing device are possible as well.

FIG. 7 shows that sequence 700 can continue at block 736 with computing device 130 sending a message to device service 104 regarding a pull printing job. A pull printing job can be a request for a print job stored on a server, such as server computing device(s) 105, and released for execution at a printing device, such as multi-function printer 140. In other embodiments, the pull printing job can be stored at a different computing device than either computing device 130 or a computing device of server computing device(s) 105, such as computing device 160. In still other embodiments, the pull printing job can involve a request that the server generate a print job to print documents specified in the pull printing job, where the documents can be stored on and/or be accessible to the server.

At block 738, device service 104 can forward the pull printing job to document service 106. Upon reception of the pull printing job, document service 106 can determine what job data, including documents and/or files, are to be retrieved for the pull printing job, determine where the job data are located, and retrieve the job data to execute the pull printing job.

Document service 106 can, at block 740, return job data to device service 104. The job data can, at block 742, be forwarded from device service 104 to multi-function printer 140. Then, at block 744, multi-function printer 140 can execute the pull printing job by printing part or all of the job data; e.g., document files associated with the pull printing job.

In some embodiments, sequence 700 can include determining job accounting information for the pull printing job. In some embodiments, the techniques for determining job accounting information for the pull printing job can be similar to the techniques for determining job accounting information performed in sequences 400, 500, and 600 discussed in the context of FIG. 4, FIG. 5, and FIG. 6, respectively. In other embodiments, job accounting information for the pull printing job can be requested and/or received at the time the pull printing job is received. In other embodiments, job accounting information for a pull printing job can be determined using other techniques.

Example User Interfaces

Figure 8F:
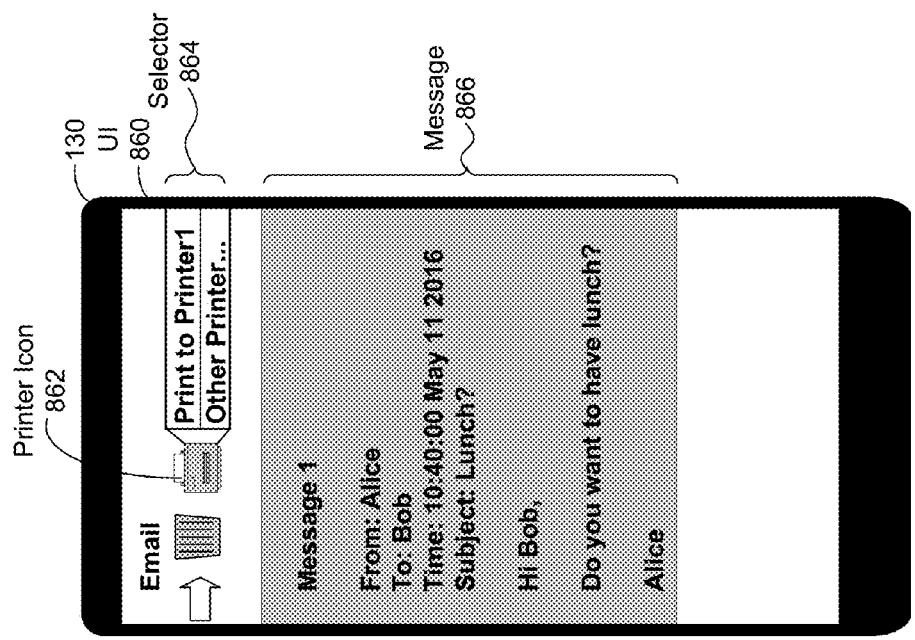
FIG. 8F shows a user interface to an e-mail application, in according to an example embodiment.

FIGS. 8A-8F illustrate user interface 800 for a printing services application, according to an example embodiment. FIG. 8A shows computing device 130 displaying user interface (UI) 800 for a "printing services application"; e.g., printing services client 134 (or printing services client 164 for computing device 160).

A graphical user interface, such as user interface 800 can enable interaction between a computing device, such as computing device 130, and server-based printing services, such as printing services 110 provided by server computing device(s) 105. In some examples, the graphical user interface can also enable interaction with printing services hosted by the computing device. In other examples, the graphical user interface can enable interaction between printing services and other applications provided by the computing device; e.g., printing of documents, text messages, e-mails, review of text and/or e-mail messages related to printing services, screen prints for computing device 130 printed on printing devices managed by printing services 110, such as multi-function printer 140.

User interface 800 includes buttons 810, 820, 830, 840, 850 that can enable selection from among at least five features related to printing services client 134: button 810 can enable selection of a "Get Accounting Information" feature, button 820 can enable selection of an "Access Nearby Printing Device" feature, button 830 can enable selection of a "Get Job Status" feature, button 840 can enable selection of a "Get Error Info[rmation]" feature, and button 850 can enable selection of a "Settings" feature.

When selected, button 810 can enable interaction between computing device 130, printing services client 134, and counter accounting service 112 and/or other job accounting software, button 820 can enable interaction between computing device 130, printing services client 134, and identity provider 108 and/or other authentication software, button 830 can enable interaction between computing device 130, printing services client 134, multi-function printer 140, device service 104, and/or other job-related software, button 840 can enable interaction between computing device 130, printing services client 134, multi-function printer 140, device service 104, and/or other error reporting and/or job-related software, and button 850 can enable selection of options or "settings" used to control user interface 800. In other embodiments, user interface 800 can have more, fewer, and/or different controls, such as buttons, and/or user interface 800 can enable selection of more, fewer, and/or different features.

FIG. 8B shows user interface 800 for computing device 130 displaying report 812 of accounting information. Button 810, if selected, can lead to user interface 800 providing accounting information that can be obtained using counter accounting service 112. The accounting information can be presented as a report, such as report 812, by user interface 800.

In this example, the job accounting information includes information about recent printing device usage. Report 812 includes job accounting information for a user "Alice1" dated "May 13, 2016" at "2:28 PM". The job accounting information includes "MFP" or multi-function printer usage data for "May, 2016". FIG. 8A shows that report 812 includes an indication that Alice1 requested 10 print jobs having 135 total pages and 20 copy jobs having 500 total pages, for a total of 635 printed pages, as well as 37 scan jobs involving 1488 pages. Report 812 also indicates that, of the 135 pages printed for the 10 print jobs, 96 color pages were printed and 39 "B/W" or black and white pages were printed. Report 812 also indicates that, of the 500 pages printed for the 20 copy jobs, 90 color pages were printed and 410 black and white pages were printed, leading to totals of 186 color pages, 449 black and white pages, and a total of 635 printed pages In this example, the job accounting information also includes information about available printing device usage. Report 812 indicates that user Alice1 has been authorized to print and/or copy up to 9,365 more printed pages in May, 2016 and can make an unlimited number of scans. In other embodiments, more, less, and/or different job accounting information can be provided using user interface 800.

FIG. 8C shows user interface 800 displaying controls and information for "Access[ing a] Nearby Printing Device" that include selector 822a, button 822b, image window 824, and report 828a. FIG. 8D shows user interface 800 displaying controls and information for "Access[ing a] Nearby Printing Device" that include selector 822a, button 822b, and report 828b. The user interface displayed in FIG. 8D differs from the user interface displayed in FIG. 8C based on selector 822a—in FIG. 8C, selector 822a is set to get a printer identifier "With [a] Camera" and in FIG. 8D, selector 822a is set to get a printer identifier "With RFID/RFC" sensors. In other examples, more and/or different techniques to obtain printer identifiers can be selected using selector 822a than the "Camera"-based and "RFID/RFC"-based techniques indicated in FIGS. 8C and 8D.

FIG. 8C shows that selector 822a indicates that the camera-based technique is to be used to obtain a printer identifier. To that end, report 828a instructs to "Press Get ID button when QR or Barcode for printer is visible"; that is, user interface 800 instructs a user of computing device 130 to press "Get ID" button 822b when a QR code or bar code is visible in image window 824. In the example shown in FIG. 8C, QR code 826 is visible at the center of image window 824. After button 822b is pressed, camera 132 of computing device 130 can capture an image of QR code 826. The image of QR code 826 can be processed to decode QR code 826 to obtain an identifier of a (nearby) printer—in the example shown in FIG. 8C, the identifier of the printer encoded by QR code 826 is "Printer1" as indicated in report 828a.

Then, computing device 130 can communicate with identity service 108 and/or other authentication software to request access to printer "Printer1" such as discussed above in the context of FIGS. 3A, 4, 5, and 7. Report 828a of FIG. 8C indicates that computing device 130 first "Request[s] access to Printer1" and then "Access" to Printer1 is "Granted".

Turning to FIG. 8D, selector 822a indicates that a RFID/RFC-based technique is to be used to obtain a printer identifier. To that end, report 828b instructs a user of computing device 130 to "place this device near printing device". By placing computing device 130 near an identifier of a printing device; e.g., identifier 148 of multi-functional printer 140, then RFID and/or RFC sensor(s) can be place in range to read data stored, encoded, and/or embedded in an RFID and/or RFC device(s) of the identifier of a printing device. The data read from the RFID and/or RFC device(s) can include the printing identifier, thus providing the printing identifier to computing device 130 via RFID and/or RFC device(s).

In the example shown in FIG. 8D, the RFID and/or RFC sensor(s) of computing device 130 read data indicating that the identifier of a (nearby) printer is "Printer1" as indicated in report 828b. Then, computing device 130 can communicate with identity service 108 and/or other authentication software to request access to printer "Printer1" such as discussed above in the context of FIGS. 3A, 4, 5, 7, and 8C. Report 828d indicates that computing device 130 first "Request[s] access to Printer1" and then "Access" to Printer1 is "Granted".

Figure 8E:
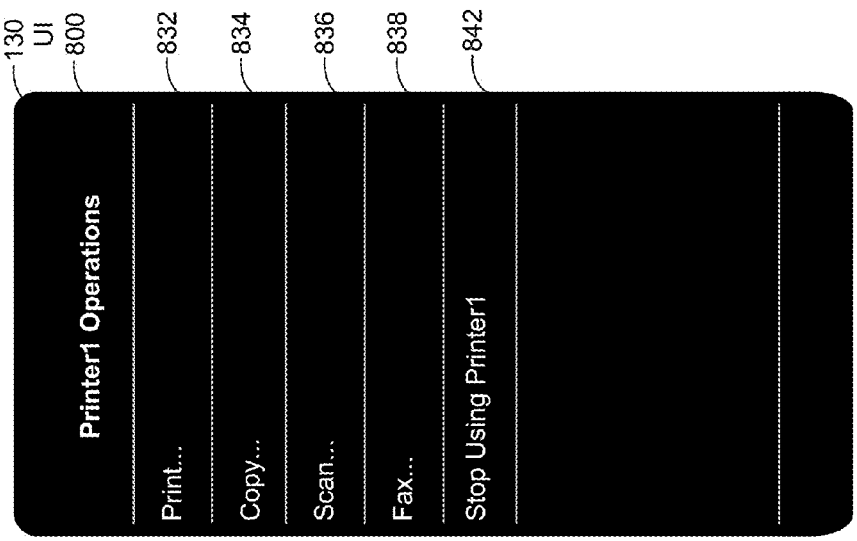

FIG. 8E shows a display of operations for printing device "Printer1" once access is granted to the printer, as discussed above in the context of FIGS. 8C and 8D. The operations available as displayed by user interface 800 include a print operation, a copy operation, a scan operation, a fax operation, and an operation to stop using the printer; i.e., log off from the printing device.

Buttons 832, 834, 836, 838, and 842 can be used to control operations for a printing device once access has been granted to the printing device. Button 832 can be used to initiate printing one or more items; e.g., files, documents, messages, etc. using the printing device; e.g., Printer1 for the example shown in FIG. 8E. Button 834 can be used to initiate copying of one or more items using Printer1. Button 836 can be used to initiate scanning of one or more items using Printer1. Button 838 can be used to initiate sending or receiving of one or more facsimiles (faxes) using Printer1. Button 842 can be used to log off of Printer 1. In other embodiments, user interface 800 can have more, fewer, and/or different controls than shown in FIG. 8E, such as buttons, and/or user interface 800 can enable selection of more, fewer, and/or different selections of operations for printing devices than shown in FIG. 8E.

FIG. 8F shows user interface 860 to an e-mail application for computing device 130, in according to an example embodiment. User interface 860 has been executed after logging into printing device "Printer1" discussed above in the context of FIGS. 8C-8E. User interface 860 includes printer icon 862, selector 864, and e-mail message 866. Selector 864 can be generated upon selection of printer icon 862 and can be used to select a printing device to print e-mail, such as message 866. Selector 864 can include selections to print message 866 using either Printer1 or another printer. As such, a printing device that has been logged into by one application and/or user interface; e.g., user interface 800, can be utilized by another application and/or user interface; e.g., user interface 860. Upon selection of Printer1 via selector 864, then message 866 can be printed using Printer1; in some embodiments, the printing of message 866 can be performed using printing services 110.

Example Methods

Figure 9:
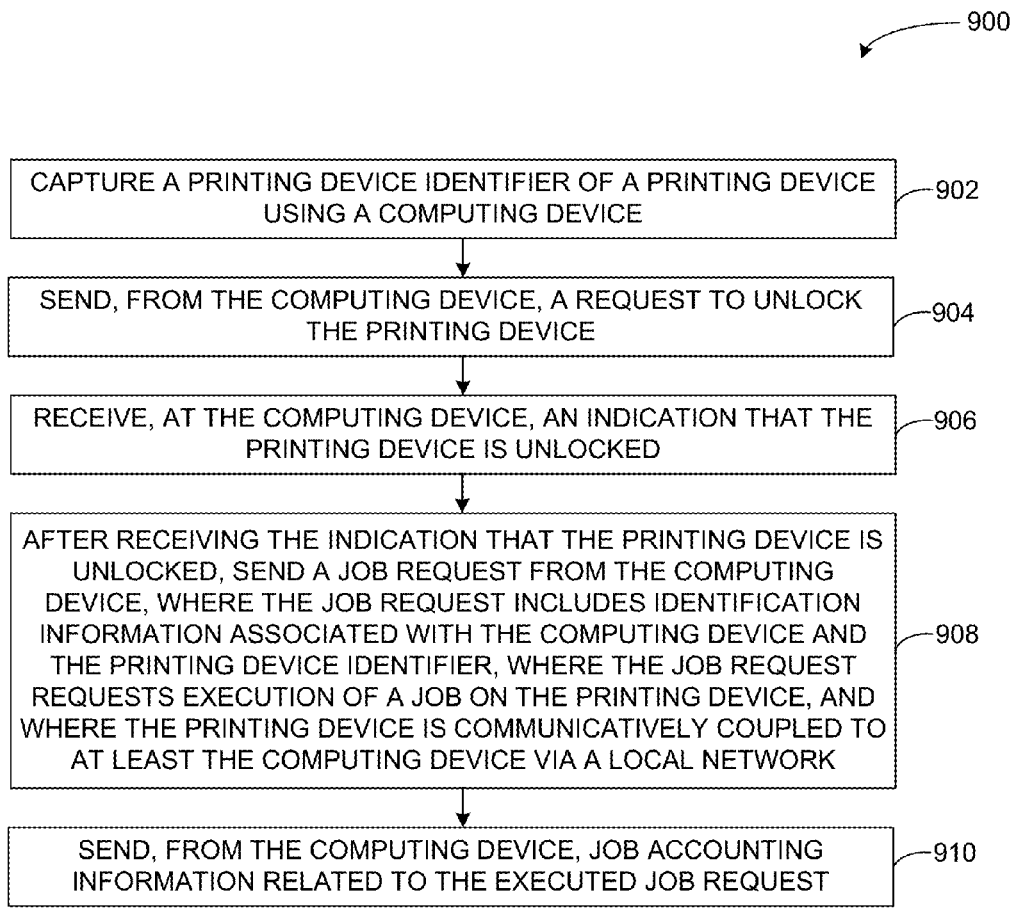
FIG. 9 is a flowchart illustrating a method, according to an example embodiment.

FIG. 9 is a flow chart illustrating method 900, according to an example embodiment. Method 900 can be executed by a computing device, such as computing device 200 discussed above in the context of FIG. 2. In other examples, other devices or systems can execute method 900.

Method 900 can begin at block 902. At block 902, a computing device can capture a printing device identifier of a printing device, such as discussed above at least in the context of FIG. 3. In some embodiments, the printing device includes a QR code encoding the printing device identifier of the printing device. Then, capturing the printing device identifier of the printing device can include capturing the QR code using a camera, such as discussed above at least in the context of FIGS. 1 and 3. In other embodiments, the printing device can include an NFC device storing the printing device identifier of the printing device. Then, capturing the printing device identifier of the printing device can include capturing the printing device identifier from the NFC device using an NFC sensor, such as discussed above at least in the context of FIGS. 1 and 3.

At block 904, the computing device can send a request to unlock the printing device, such as discussed above at least in the context of FIG. 3.

At block 906, the computing device can receive an indication that the printing device is unlocked, such as discussed above at least in the context of FIG. 3. In some embodiments, the printing device is associated with a printer locking device that is configured to: receive the request to unlock the printing device and unlock the printing device in accord with the instruction to unlock the printing device, such as discussed above at least in the context of FIG. 3.

At block 908, the computing device can, after receiving the indication that the printing device is unlocked, send a job request. The job request can include identification information associated with the computing device and the printing device identifier. The job request can request execution of a job on the printing device, where the printing device is communicatively coupled to at least the computing device via a local network, such as discussed above at least in the context of FIG. 3.

In some embodiments, the job can be one or more of: a scan job, a copy job, a direct print job, and a pull printing job, such as discussed above at least in the context of FIGS. 1, 5, 6, and 7. In other embodiments, the identification information associated with the computing device comprises one or more of: an Internet Protocol address, Global Positioning System data, a username, and a password, such as discussed above at least in the context of FIGS. 1 and 4. In even other embodiments, sending the job request can include: determining a user identifier associated with the job request, where the user identifier is associated with a printing account, and where the printing account includes a remaining-page-count value; determining a page count associated with the job request; determining whether the page count associated with the job request is less than the remaining-page-count value; and after determining that the page count associated with the job request is less than the remaining-page-count value, sending the job request from the computing device, where the identification information includes the user identifier, such as discussed above at least in the context of FIG. 3.

At block 910, the computing device can send job accounting information related to usage of the printing device related at least to the executed job request, such as discussed above at least in the context of FIG. 3. In some embodiments, the job accounting information for the job can include one or more of: a quantity of color sheets corresponding to the executed job request, a quantity of black and white sheets corresponding to the executed job request, a duration corresponding to the executed job request, a start time corresponding to the executed job request, and an end time corresponding to the executed job request, such as discussed above at least in the context of FIG. 3.

In some embodiments, method 900 further includes: sending, from the computing device, a request for a report of job accounting information related to the computing device; receiving, at the computing device, information for the report of job accounting information related to the computing device; and generating, using the computing device, the report of job accounting information related to the computing device based on the information for the report, such as discussed above at least in the context of FIGS. 3 and 8. In other embodiments, method 900 further includes: receiving, at the computing device, an instruction to monitor usage of the printing device that is associated with the computing device. Then, sending the job accounting information related to usage of the printing device related at least to the executed job request can include: sending, from the computing device, a request for job accounting information; and receiving, at the computing device, the requested job accounting information, such as discussed above at least in the context of FIG. 3.

In the present disclosure, reference is made to the accompanying figures, which form a part hereof. It should be understood, however, that the arrangements described herein are set forth as examples only. As such, those skilled in the art will appreciate that other arrangements and elements (e.g., machines, interfaces, functions, orders of functions, etc.) can be used instead or in addition. Further, many of the elements described herein are functional entities that may be implemented as discrete or distributed components or in conjunction with other components, and in any suitable combination and location. Various functions described herein as being performed by one or more entities may be carried out by hardware, firmware and/or software logic. For instance, various functions described herein may be carried out by a processor executing instructions written in any suitable programming language and stored in memory.

In the present disclosure and in the claims, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

The present disclosure is not to be limited in terms of the particular embodiments described in this application, which are intended as illustrations of various aspects. Modifications and variations can be made without departing from the scope of this disclosure, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

With respect to any or all of the ladder diagrams, scenarios, and flow charts in the figures and as discussed herein, each block and/or step may represent a processing of information and/or a transmission of information in accordance with example embodiments. Unless specifically indicated, steps or blocks in the any or all herein-disclosed flowcharts can be executed out of order from that shown or discussed, including substantially concurrent execution of separately described functions, or even in reverse order in some examples, depending on the functionality involved, so long as the overall functionality of the described method is maintained. Alternative embodiments may be included within the scope of such example embodiments. Further, more or fewer blocks and/or step may be used with any of the ladder diagrams, scenarios, and flow charts discussed herein, and these ladder diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, and/or a tangible storage device.

Additionally, any enumeration of elements, blocks, or steps in the present disclosure or the claims is for purposes of clarity. Thus, such enumeration should not be interpreted to require or imply that these elements, blocks, or steps adhere to a particular arrangement or are carried out in a particular order.

It should be understood that arrangements described herein are for purposes of example only. As such, those skilled in the art will appreciate that other arrangements and other elements (e.g., machines, interfaces, functions, orders, groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting with the true scope and spirit being indicated by the following claims.

The invention claimed is:

1. A method, comprising:

capturing a printing device identifier of a printing device using a computing device;

sending, from the computing device, a request to unlock the printing device to a printer locking device;

sending the request to unlock the printing device from the printer locking device to a server device via a network connecting at least the printer locking device, the printing device, the computing device, and the server device;

receiving, at the printer locking device, an indication to unlock the printing device from the server device, unlocking the printing device in accord with the indication to unlock the printing device using the printer locking device, wherein the printer locking device utilizes a printer connection between the printing device and printer locking device to unlock the printing device, the printer connection being distinct from the network;

receiving, at the computing device, an indication that the printing device is unlocked from the printer locking device;

after receiving the indication that the printing device is unlocked, sending a job request from the computing device, wherein the job request comprises identification information associated with the computing device and the printing device identifier, wherein the job request requests execution of a job on the printing device, wherein the printing device is communicatively coupled to at least the computing device via a local network, and wherein the identification information associated with the computing device includes at least information related to a current geographic location of the computing device; and sending, from the computing device, job accounting information related to usage of the printing device related at least to the executed job request.

2. The method of claim 1, wherein the method further comprises:

determining, at the server device, whether an attempt to access the printing device is authorized based on the current geographic location of the computing device and a geographic location of the printer locking device.

3. The method of claim 1, wherein the job accounting information for the job includes one or more of: a quantity of color sheets corresponding to the executed job request, a quantity of black and white sheets corresponding to the executed job request, a duration corresponding to the executed job request, a start time corresponding to the executed job request, and an end time corresponding to the executed job request.

4. The method of claim 1, wherein the job is one or more of: a scan job, a copy job, a direct print job, and a pull printing job.

5. The method of claim 1, wherein the identification information associated with the computing device comprises one or more of: an Internet Protocol (IP) address, Global Positioning System (GPS) data, a username, and a password.

6. The method of claim 1, wherein the printing device comprises a Quick Response (QR) code encoding the printing device identifier of the printing device, and wherein capturing the printing device identifier of the printing device comprises capturing the QR code using a camera of the computing device.

7. The method of claim 1, wherein the printing device comprises a Near Field Communication (NFC) device storing the printing device identifier of the printing device, and wherein capturing the printing device identifier of the printing device comprises capturing the printing device identifier from the NFC device using an NFC sensor of the computing device.

8. The method of claim 1, further comprising:
sending, from the computing device, a request for a report of job accounting information related to the computing device;
receiving, at the computing device, information for the report of job accounting information related to the computing device; and
generating, using the computing device, the report of job accounting information related to the computing device based on the information for the report.

9. The method of claim 1, wherein sending the job request comprises:
determining a user identifier associated with the job request, wherein the user identifier is associated with a printing account, and wherein the printing account comprises a remaining-page-count value;
determining a page count associated with the job request;
determining whether the page count associated with the job request is less than the remaining-page-count value; and
after determining that the page count associated with the job request is less than the remaining-page-count value, sending the job request from the computing device, wherein the identification information comprises the user identifier.

10. The method of claim 1, further comprising:
receiving, at the computing device, an instruction to monitor usage of the printing device that is associated with the computing device; and
wherein sending the job accounting information related to usage of the printing device related at least to the executed job request comprises:
sending, from the computing device, a request for job accounting information; and
receiving, at the computing device, the requested job accounting information.

11. A system comprising:
a printing device;
a server device;
a printer locking device;
a network, connecting at least the printing device, the server device, the printer locking device, and a computing device;
a local network that is distinct from the network;
a printer connection between the printer locking device and the printing device that is distinct from the network; and
the computing device, communicatively coupled at least to the printing device via the local network, the computing device comprising:
one or more processors; and
a memory storing instructions that, when executed by the one or more processors, causes the computing device to perform functions comprising:
capturing a printing device identifier of the printing device;
sending a request to unlock the printing device to the printer locking device, wherein the printer locking device utilizes the printer connection to unlock the printing device in accord with an indication to unlock the printing device received at the printer locking device from the server device;
receiving an indication that the printing device is unlocked from the printer locking device;
after receiving the indication that the printing device is unlocked, sending a job request, wherein the job request comprises identification information associated with the computing device and the printing device identifier, wherein the job request requests execution of a job on the printing device, and wherein the identification information associated with the computing device includes at least information related to a current geographic location of the computing device; and
sending job accounting information related to usage of the printing device related at least to the executed job request.

12. The system of claim 11, wherein the server device is further configured to:
determine whether an attempt to access the printing device is authorized based on the current geographic location of the computing device and a geographic location of the printer locking device.

13. The system of claim 11, wherein the job accounting information for the job includes one or more of: a quantity of color sheets corresponding to the job, a quantity of black and white sheets corresponding to the job, a duration corresponding to the job, a start time corresponding to the job, and an end time corresponding to the job.

14. The system of claim 11, wherein the job is one or more of: a scan job, a copy job, a direct print job, and a pull printing job.

15. The system of claim 11, wherein the printing device comprises a Quick Response (QR) code encoding the printing device identifier of the printing device,
wherein the computing device further comprises a camera, and
wherein capturing the printing device identifier of the printing device comprises capturing the QR code using the camera.

16. The system of claim 11, wherein a Near Field Communication (NFC) device storing the printing device identifier of the printing device, wherein the computing device further comprises an NFC sensor, and wherein capturing the printing device identifier of the printing device comprises capturing the printing device identifier from the NFC device using the NFC sensor.

17. The system of claim 11, wherein the functions further comprise:
   sending a request for a report of job accounting information related to the computing device;
   receiving information for the report of job accounting information related to the computing device; and
   generating the report of job accounting information related to the computing device based on the information for the report.

18. The system of claim 11, wherein sending the job request comprises:
   determining a user identifier associated with the job request, wherein the user identifier is associated with a printing account, and wherein the printing account comprises a remaining-page-count value;
   determining a page count associated with the job request;
   determining whether the page count associated with the job request is less than the remaining-page-count value; and
   after determining that the page count associated with the job request is less than the remaining-page-count value, sending the job request from the computing device, wherein the identification information comprises the user identifier.

19. The system of claim 11, wherein the functions further comprise:
   receiving an instruction to monitor usage of the printing device that is associated with the computing device; and
   wherein sending the job accounting information related to usage of the printing device related at least to the executed job request comprises:
   sending a request for job accounting information; and
   receiving the requested job accounting information.

20. A non-transitory computer readable medium storing instructions that, when executed by one or more processors of a computing device, cause the computing device to perform functions comprising:
   capturing a printing device identifier of a printing device;
   sending a request to unlock the printing device to the printer locking device via a network connecting at least the printer locking device, the printing device, the computing device, and the server device, wherein the printer locking device utilizes a printer connection between the between the printer locking device and the printing device to unlock the printing device in accord with an indication to unlock the printing device received at the printer locking device from the server device, wherein the printer connection is distinct from the network;
   receiving an indication that the printing device is unlocked from the printer locking device;
   after receiving the indication that the printing device is unlocked, sending a job request, wherein the job request comprises identification information associated with the computing device and the printing device identifier, wherein the job request requests execution of a job on the printing device, and wherein the identification information associated with the computing device includes at least information related to a current geographic location of the computing device; and
   sending job accounting information related to usage of the printing device related at least to the executed job request.

* * * * *